US007086043B2

(12) United States Patent
Roediger et al.

(10) Patent No.: US 7,086,043 B2
(45) Date of Patent: Aug. 1, 2006

(54) COMPILER APPARATUS AND METHOD FOR UNROLLING A SUPERBLOCK IN A COMPUTER PROGRAM

(75) Inventors: Robert Ralph Roediger, Rochester, MN (US); William Jon Schmidt, Rochester, MN (US); Peter Jerome Steinmetz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 10/282,811

(22) Filed: Oct. 29, 2002

(65) Prior Publication Data

US 2004/0083459 A1 Apr. 29, 2004

(51) Int. Cl.
*G06F 9/45* (2006.01)

(52) U.S. Cl. .................. 717/150; 717/130; 717/140; 717/148; 717/151; 717/152; 717/153

(58) Field of Classification Search ........ 717/130–161; 712/10
See application file for complete search history.

(56) References Cited

U.S. PATENT DOCUMENTS

| | | | | |
|---|---|---|---|---|
| 5,696,956 A | * | 12/1997 | Razdan et al. ........... | 712/23 |
| 6,035,123 A | * | 3/2000 | Razdan et al. ........... | 717/155 |
| 6,539,541 B1 | * | 3/2003 | Geva ....................... | 717/150 |
| 6,832,370 B1 | * | 12/2004 | Srinivasan et al. ...... | 717/161 |
| 2004/0054992 A1 | * | 3/2004 | Nair et al. ................ | 717/138 |
| 2004/0250045 A1 | * | 12/2004 | Dowling et al. ......... | 712/10 |

* cited by examiner

*Primary Examiner*—Kakali Chaki
*Assistant Examiner*—Mark P. Francis
(74) *Attorney, Agent, or Firm*—Martin & Associates, LLC; Derek P. Martin

(57) ABSTRACT

A superblock unroller creates a superblock in a first instruction stream, and unrolls the superblock using different methods depending on the suitability of the superblock to different types of unrolling. The superblock unroller uses complete unrolling if a number of iterations of the superblock is sufficiently small and if the number of iterations is known at compile-time. The superblock unroller uses static unrolling if the number of iterations of the superblock is too large for complete unrolling and if the number of iterations is known at compile-time. The superblock unroller uses dynamic unrolling if the number of iterations of the superblock is unknown at compile-time. Each of these unrolling methods may include the insertion of count rectification code into the first instruction stream to account for execution that exits the superblock. Code performance may be improved by providing the sophisticated unrolling of superblocks disclosed herein.

17 Claims, 36 Drawing Sheets

COMPILER APPARATUS AND METHOD FOR UNROLLING A SUPERBLOCK IN A COMPUTER PROGRAM

BACKGROUND OF THE INVENTION

1. Technical Field

This invention generally relates to computer systems, and more specifically relates to compilers that generate executable code for computer systems.

2. Background Art

Since the dawn of the computer age, computer systems have evolved into extremely sophisticated devices, and computer systems may be found in many different settings. Dramatic advances in both hardware and software (e.g., computer programs) have drastically improved the performance of computer systems. Modem software has become very complex when compared to early computer programs. Many modem computer programs have tens or hundreds of thousands of instructions. The execution time (and hence, performance) of a computer program is very closely related to the number of instructions that are executed as the computer program runs. Thus, as the size and complexity of computer programs increase, the execution time of the computer program increases as well.

Unlike early computer programs, modem computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

The execution time of a computer program, especially complex computer programs, is a function of the arrangement and type of instructions within the computer program. Loops affect the execution time of a computer program. If a computer program contains many loops, or contains any loops that are executed a relatively large number of times, the time spent executing loops will significantly impact the execution time of a computer program.

In order to optimize the performance of modem computer programs, profilers have been developed to predict and/or measure the run-time performance of a computer program. Profilers typically generate profile data that estimates how often different portions of the computer program are executed. Using profile data, an optimizer (such as an optimizing compiler) may make decisions to optimize loops in a computer program in order to improve the execution speed of the computer program.

Known methods for using profile data to optimize loops in a computer program do not provide an optimal solution. As a result, the prior art may yield inefficiencies in loops that result in a slower execution time for the computer program. Without improved apparatus and methods for optimizing loops in a computer program, a compiler will generate a computer program that is not as fully optimized as it might be.

DISCLOSURE OF INVENTION

According to the preferred embodiments, a superblock unroller creates a superblock in a first instruction stream, and unrolls the superblock using different methods depending on the suitability of the superblock to different types of unrolling. The superblock unroller uses complete unrolling if a number of iterations of the superblock is sufficiently small and if the number of iterations is known at compile-time. The superblock unroller uses static unrolling if the number of iterations of the superblock is too large for complete unrolling and if the number of iterations is known at compile-time. The superblock unroller uses dynamic unrolling if the number of iterations of the superblock is unknown at compile-time. Each of these unrolling methods may include the insertion of count rectification code into the first instruction stream to account for execution that exits the superblock. Code performance may be improved by providing the sophisticated unrolling of superblocks disclosed herein.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION 1.0 Overview

The present invention relates to optimizing loops in a computer program. For those not familiar with compilers or known loop optimization methods, this Overview section will provide background information that will help to understand the present invention.

Known Compilers

Figure 2:
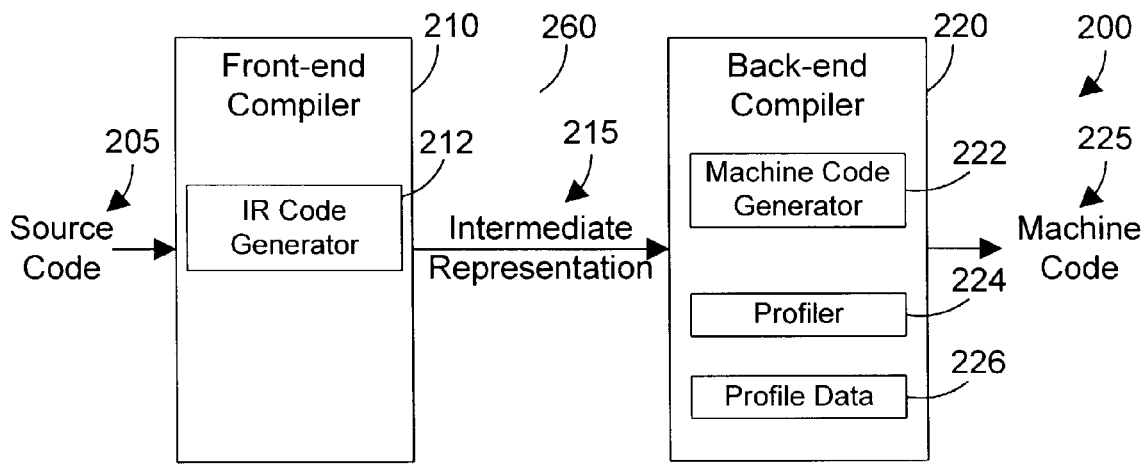
FIG. 2 is a block diagram of a prior art compiler system.

FIG. 2 illustrates a prior art compiling system 200 that includes a front-end compiler 210 and a back-end compiler 220. For most known compilers, there is an architected division (indicated by dotted line 260) between the front-end compiler 210 and the back-end compiler 220. Front-end compilers 210 are used to convert source code 205 to an intermediate representation 215. Back-end compilers 220 are used to convert the intermediate representation 215 to machine code 225 for a particular hardware configuration (i.e., platform). This designed division between front-end compilers and back-end compilers is efficient, because it allows front-end compilers for a number of different languages (e.g., C++, Java, Ada, etc.) to be used with a single back-end compiler for a given platform (e.g., IBM iSeries). Likewise, a single front-end compiler for the Java programming language can be used with multiple back-end compilers if the code needs to be compiled to run on different platforms.

Front-end compiler 210 includes an IR code generator 212 that processes the source code 205 and generates instructions in intermediate representation 215. Back-end compiler 220 includes a machine code generator 222 that processes the intermediate representation 215 and generates machine code 225 that is executable on a particular platform. Back-end compiler 220 also includes a profiler 224 that is used to obtain profile data 226 when the machine code 225 is run with a set of sample inputs. As used herein, the term "sample inputs" means inputs that simulate real-world execution of the machine code in its intended environment. Machine code generator 222 includes the capability of using profile data 226 to optimize the machine code 225 by processing the intermediate representation code 215 a second time according to the profile data 226.

Profile-based Loop Optimizations in Known Compilers

Figure 3:
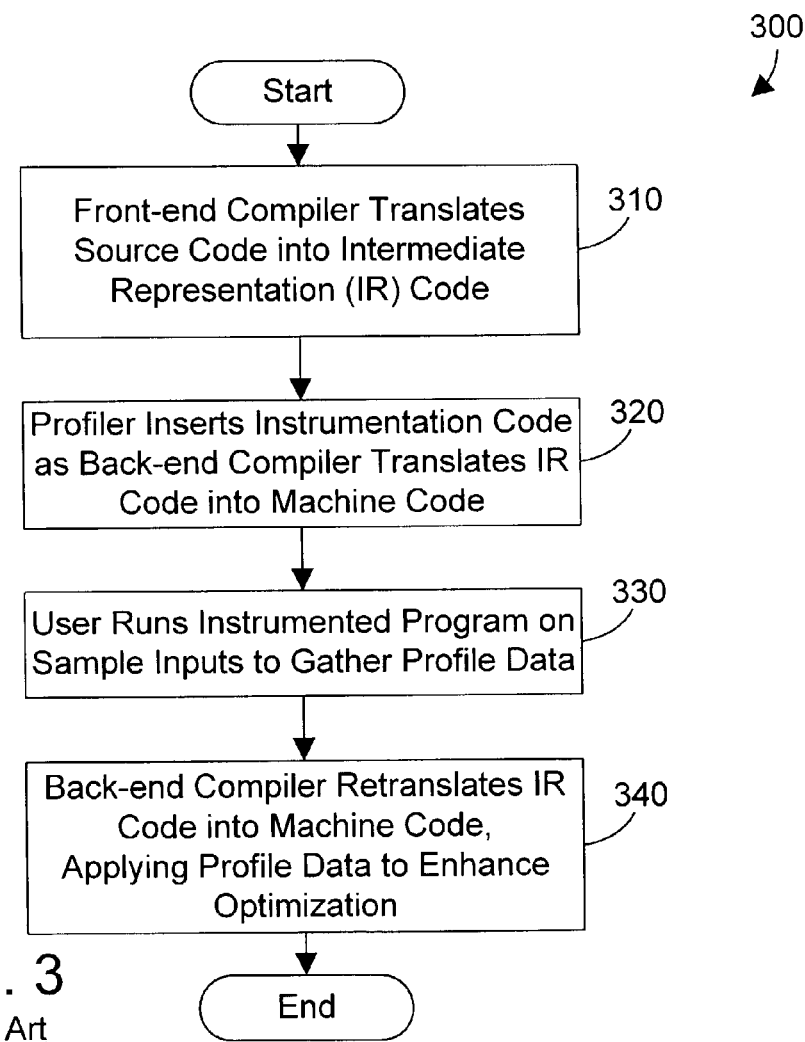
FIG. 3 is a flow diagram showing steps in a prior art method for compiling source code using the compiler system of FIG. 2.

FIG. 3 is a flow diagram of a prior art method 300 for compiling source code using the prior art compiling system 200 in FIG. 2. First, the front-end compiler translates the source code into intermediate representation (IR) code (step 310). Next, the back-end compiler processes the intermediate representation, inserting instrumentation code into the machine code (step 320). Instrumentation code is code that typically increments counters to keep track of how many times each branch in the machine code 225 is taken versus not taken when the machine code 225 is executed with a sample set of inputs that are designed to simulate the real-world environment for executing the machine code 225. Once the instrumentation code is inserted into the machine code 225, the instrumented program (i.e., machine code) is run using sample inputs, and profile data regarding the execution is gathered (step 330). For the case of instrumented code, the profile data consists of count values for each branch in the machine code that indicate the number of times the branch was taken versus not taken. The back-end compiler then retranslates the IR code into machine code, applying the profile data to enhance optimization of the computer program (step 340). Note from FIGS. 2 and 3 that profile-based optimizations are typically done in the back-end compiler. However, profile-based optimizations may also be performed by a link-time optimizer as well, or could be performed on-the-fly while a program is running.

Method 300 of FIG. 3 assumes in step 320 that the profiler inserts instrumentation code into the machine code. Note, however, that profiling may also occur via sampling, which uses a time-based interrupt in the operating system to periodically halt program execution and determine the current address. Sampling does not require the insertion of instrumentation code, and is another known way to collect profile data. In general sampling is less intrusive than inserting instrumentation code, but it is also correspondingly less accurate. Sampling is limited to identifying which blocks of code are frequently executed, but does not generally indicate which branches were taken to get to the frequently-executed blocks.

There are many ways known in the art to acquire profile data and to use the profile data to optimize code. For a general discussion of one specific way to optimize code using profile data, see Schmidt et al., "Profile-Directed Restructuring of Operating System Code", IBM Systems Journal, vol. 37 no. 2, p. 270–297 (1998).

One known way to optimize loops in the prior art according to profile data is loop unrolling, which is a technique used on loops that are expected to iterate many times each time they are entered. The loop body is replaced by N copies of itself, where N is an unroll factor determined heuristically. The last iteration is changed to target the first iteration, so the N copies together form an expanded loop. The unrolled iterations can be optimized together within the loop.

One technique used in the art for optimizing loops forms superblocks. A superblock is a portion of code that has no side entrances, that is, join points. Superblock formation was initially developed to find more instruction-level parallelism across larger blocks of code. The essential idea behind superblock formation is to remove join points from "hot" code traces by duplicating code. Superblock formation is described in detail in Hwu et al., "The Superblock: An Effective Technique for VLIW and Superscalar Compilation", Journal of Supercomputing, 7, 229–248 (1993).

Figure 4:
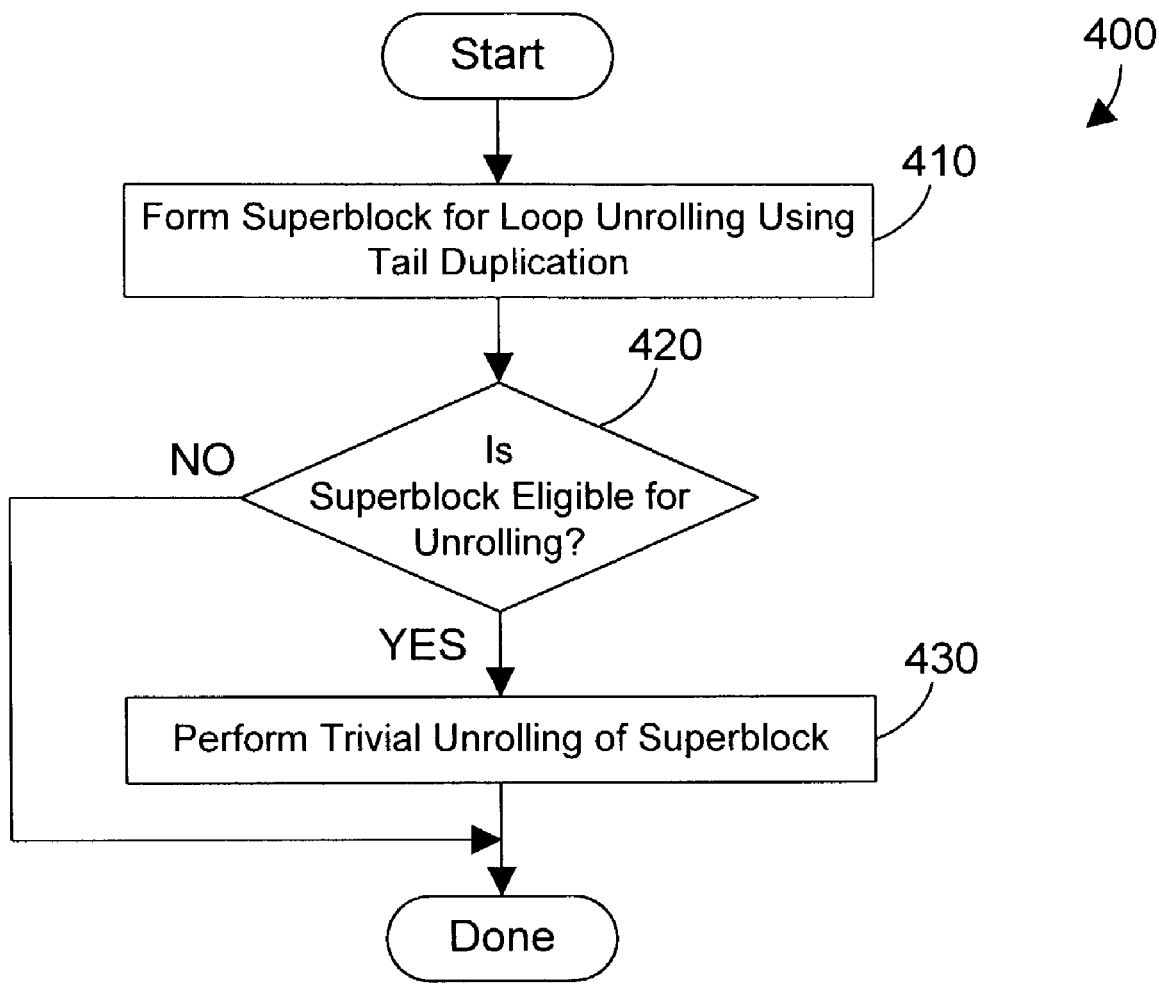
FIG. 4 is a flow diagram showing trivial unrolling of superblocks as known in the prior art.

The prior art concept of loop unrolling has been applied to superblock loops. However, known loop unrolling for superblock loops is limited to trivial unrolling. Referring to FIG. 4, a prior art method 400 begins by forming a superblock for loop unrolling using tail duplication (step 410). The concept of tail duplication is discussed in more detail below. Once the superblock is formed in step 410, method 400 determines whether the superblock is eligible for unrolling (step 420). If not (step 420=NO), method 400 ends. If so (step 420=YES), trivial unrolling may be performed on the superblock (step 430). An example follows to illustrate the steps in FIG. 4.

Figure 5:
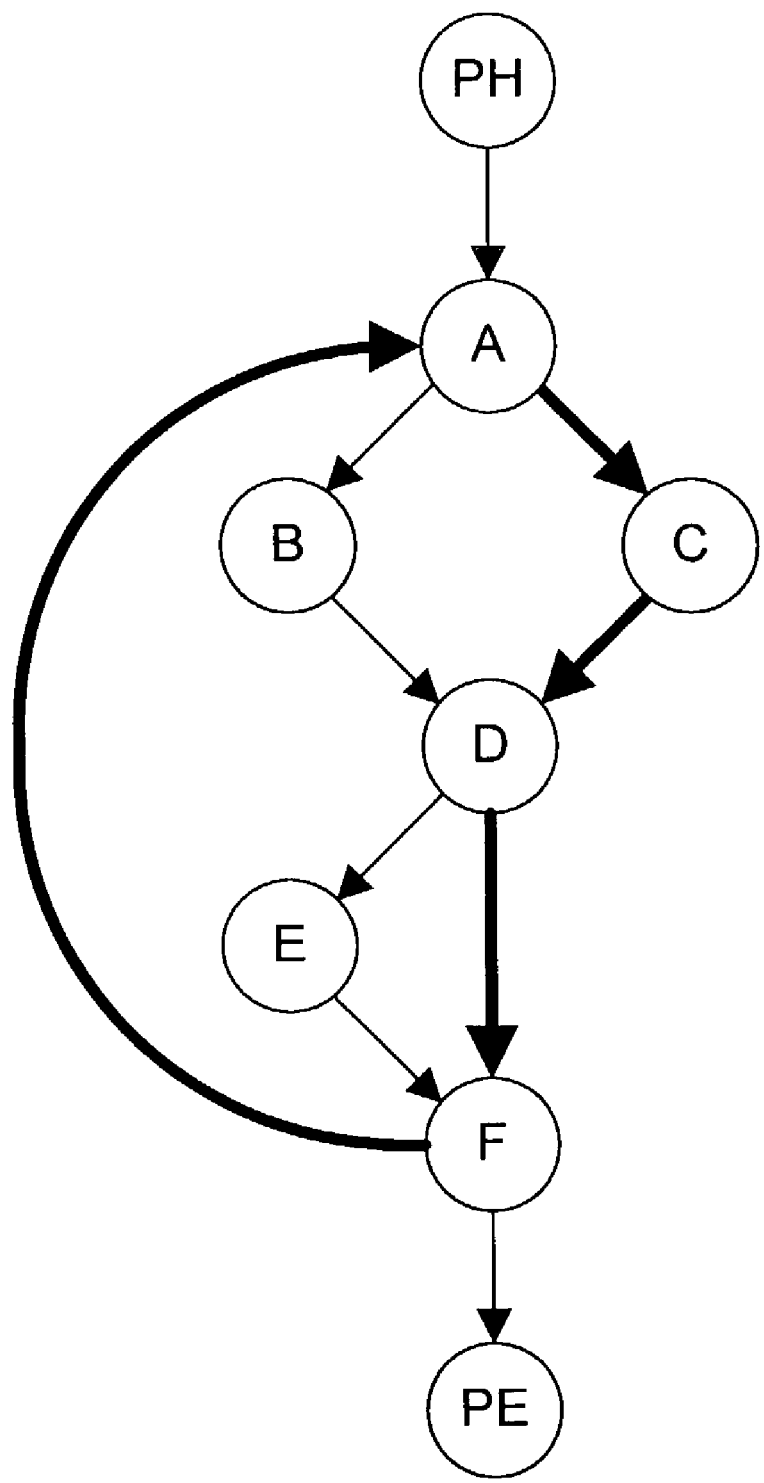
FIG. 5 is a sample control flow graph showing a hot path through the code as indicated by profile data.
Figure 6:
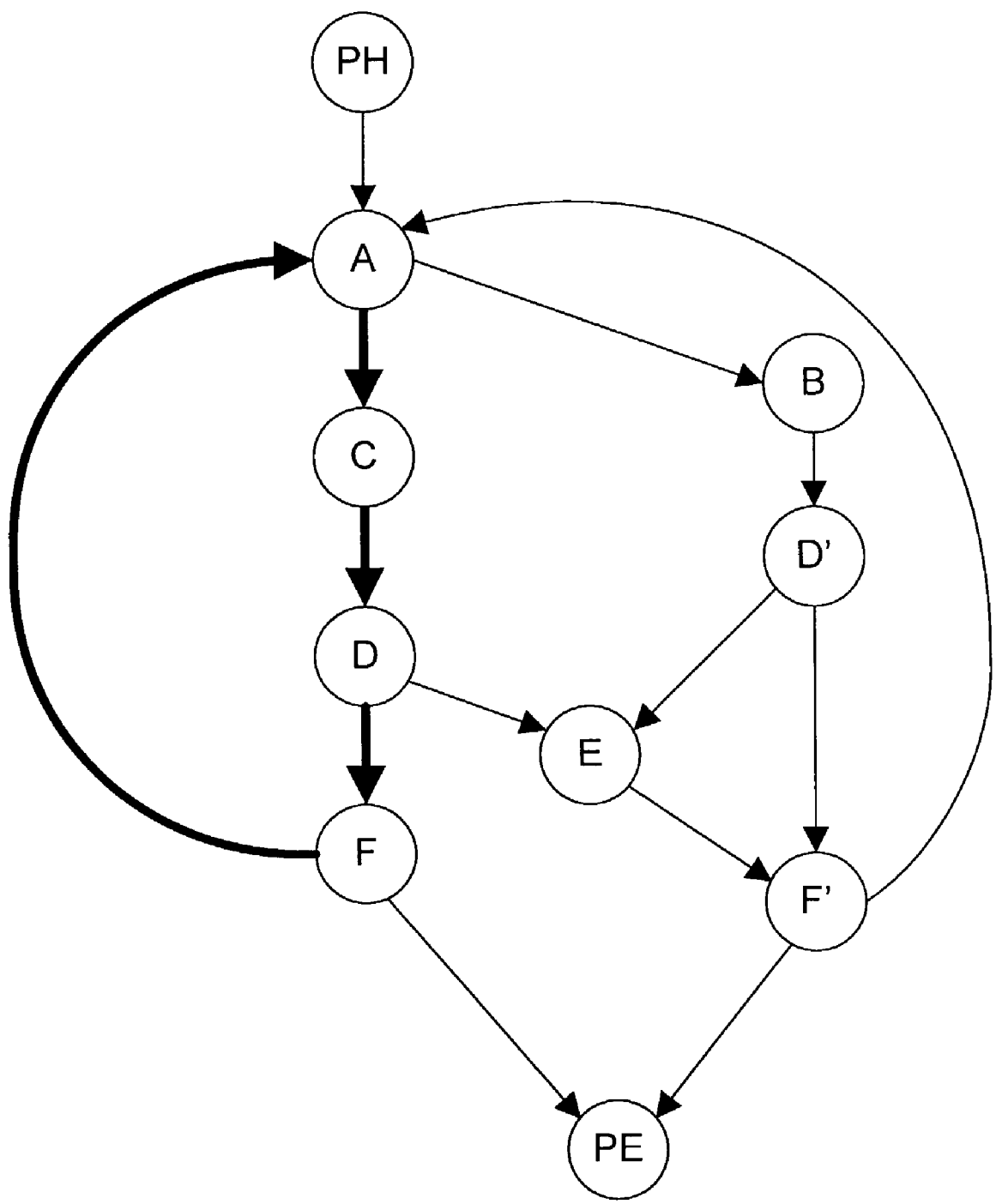
FIG. 6 is a flow diagram of a prior art method for generating a superblock from the control flow graph shown in FIG. 5.

A sample control flow graph for a loop in a computer program is shown in FIG. 5. Block PH is a "pre-header" block preceding the loop, block PE is a "post-exit" block following the loop, and blocks A, B, C, D, E and F are members of the loop. We assume that profile data indicates that the path A-C-D-F is by far the most dominant path at run time (as indicated by the bold arrows in FIG. 5), but there are join points at both blocks D and F. Applying tail duplication as taught by Hwu et al. supra creates copies of blocks in the trace following the first join point, as shown in FIG. 6. The introduction of blocks D' and F' have allowed the trace A-C-D-F to exist without join points, allowing more optimization. For example, instructions from blocks C and D can be optimized together, where before this may not have been possible. Superblock formation is particularly useful in loops, where removal of join points from the hottest loop trace can result in a significant improvement in program performance.

Figure 7:
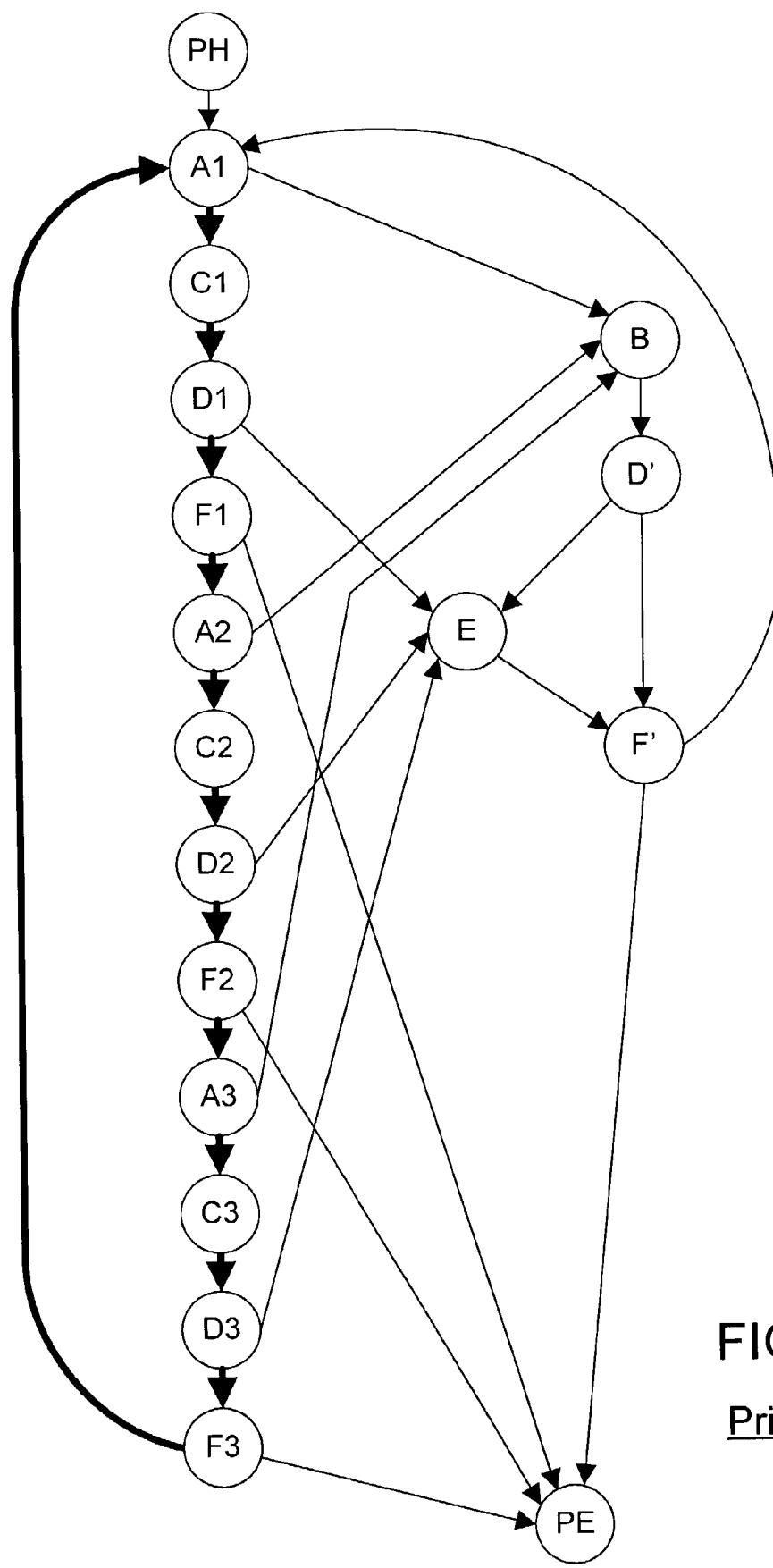
FIG. 7 is a control flow graph showing how superblock in FIG. 6 may be unrolled using trivial unrolling in accordance with the prior art method in FIG. 4.

Once a superblock has been identified in a loop, the prior art may perform trivial unrolling of the superblock, provided that the superblock constitutes a complete loop iteration. Trivial unrolling means the superblock may itself be duplicated one or more times to allow discovery of optimization opportunities across different loop iterations. Since each iteration contains no join points, this leads to a larger superblock containing no join points, as shown in FIG. 7, where the superblock in FIG. 6 has been unrolled three times.

One problem with the prior art methods is that only trivial unrolling has been used to unroll a superblock. Trivial unrolling makes no attempt to determine how often the superblock will be executed each time the loop is entered. Therefore, the induction condition (for example, subtract 1 and compare to zero, branch if equal) is duplicated at the end of each copy of the loop trace. Thus, in FIG. 7, every copy of block F, namely F1, F2, F3, and F', have a possible exit to block PE. However, it is often the case that we know how often a loop will be executed. For example, a C++ loop of the form "for (i=0;i<5;i++) { ... }" will execute exactly five times. In this case, it is not necessary for every copy of block F to contain the induction condition and branch. Yet the trivial unrolling of a superblock as shown in FIG. 7 that is known in the art does not recognize this. As a result, some optimizations in the prior art that could be made are currently not made.

The reason the prior art does not take advantage of the opportunity to remove instructions that contain unneeded induction condition and branches (which is common for full loop unrolling, as opposed to superblock unrolling), is because of the problem with arcs that prematurely leave the superblock trace. Not only does the last copy of block F (F3) return to the top of the loop at block A1, but so does the tail-copied block F'. Block F' itself also contains a copy of the induction condition. If the induction condition were removed from the superblock trace but not from the tail-copied blocks, the loop termination in the tail-copied blocks will not execute correctly. Furthermore, if the unrolled superblock is re-entered at block A1 via the arc from block F', the number of remaining iterations may be incorrect. The preferred embodiments provide more advanced ways to unroll superblocks that provide count rectification, where needed, to allow unrolling of the superblock in a more sophisticated way that will allow a greater level of optimization while always yielding correct results.

2.0 Detailed Description

The preferred embodiments provide a compiler that performs enhanced loop optimizations by unrolling a superblock in a loop to eliminate join points in the hot path through the loop. One or more instructions may be added to the less-frequently executed paths to allow better optimization of the superblock. These additional instructions provide count rectification that takes into account when the tail portions of the loop are entered and exited instead of executing the hot trace in the superblock. By providing more sophisticated unrolling criteria and methods at the expense of instructions in less-frequently executed portions of the loop, the overall performance of the loop is increased.

Figure 1:
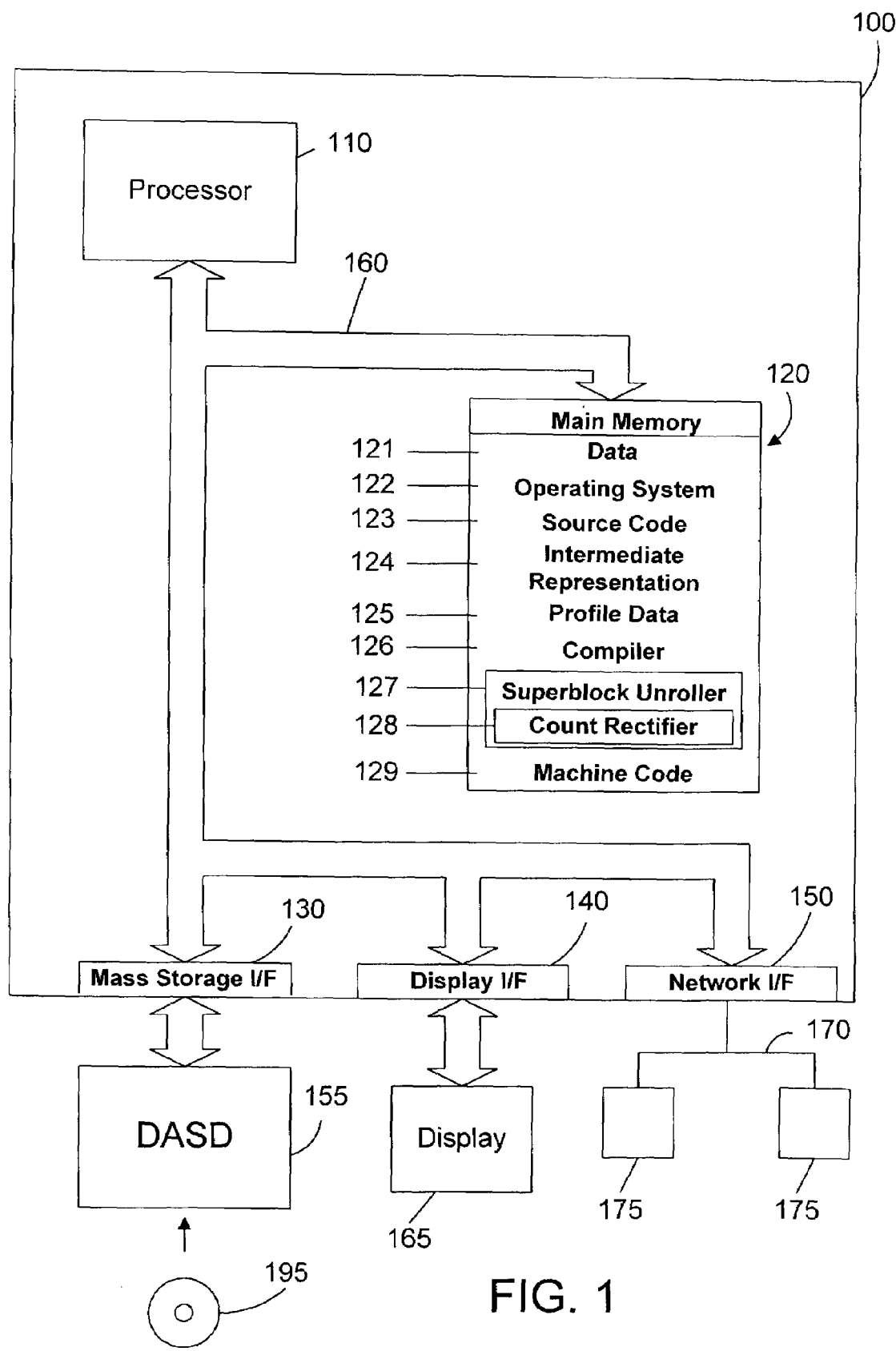
FIG. 1 is a block diagram of a computer system in accordance with the preferred embodiments.

Referring now to FIG. 1, a computer system 100 is one suitable implementation of an apparatus in accordance with the preferred embodiments of the invention. Computer system 100 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD-RW drive, which may store data to and read data from a CD-RW 195.

Main memory 120 in accordance with the preferred embodiments contains data 121, an operating system 122, source code 123, an intermediate representation 124, profile data 125, a compiler 126, and machine code 129. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Source code 123 is a computer program or portion thereof written in a high-level language. Intermediate representation 124 is intermediate code that is generated from the source code 123 by a front-end compiler, which may be part of compiler 126, or may be a different compiler not shown in FIG. 1. Profile data 125 is data collected by any suitable profiling method, including without limitation instrumenting profilers and sampling profilers. Profile data 125 suitably includes counts of the number of times a branch is taken. Compiler 126 includes a superblock unroller 127 that optimizes code in the intermediate representation 124 according to profile data 125. Superblock unroller 127 includes a count rectifier 128 that accounts for required changes to the loop counter when execution enters or leaves the superblock. Note that the profiler that generates the profile data 125 is not explicitly shown in FIG. 1, but is assumed to be part of compiler 126. Machine code 129 is the executable code generated by the compiler 126 from the intermediate representation 124.

Note that the source code 123, intermediate representation 124, profile data 125, compiler 126, and machine code 129 are all shown residing in memory 120 for the convenience of showing all of these elements in one drawing. One skilled in the art will appreciate that this is not the normal mode of operation for most compilers. A front-end compiler may process source code 123 and generate therefrom intermediate representation 124. This processing may occur on a computer system separate from computer system 100. A profiler may then insert instrumentation code into the intermediate representation 124, and run the instrumented code on a different computer system to collect profile data 125. Compiler 126 processes intermediate representation 124 and generates therefrom machine code 129, which may also occur on a separate computer system. In the extreme, source code 123 could reside on a first computer system and a front-end compiler could reside on a second computer system. The front-end compiler could read the source code 123 from the first computer system, generate the intermediate representation 124, and store the intermediate representation 124 on a third computer system. A profiler could then read the intermediate representation 124 from the third computer system, insert instrumentation code, and store the instrumented code on a fourth computer system. The profiler could then read the instrumented code from the fourth computer system, execute the instrumented code on a fifth computer system, and store the resulting profile data on a sixth computer system. Compiler 126 could be executed on a seventh computer system, which reads the intermediate representation 124 from the third computer system and the profile data from the sixth computer system, and generates therefrom machine code 129, which could be written to an eighth computer system. This simple example shows that the preferred embodiments expressly extend to any suitable configuration and number of computer systems to accomplish the front-end and back-end compiling. The "apparatus" described herein and in the claims expressly extends to a multiple computer configuration, as described by the example above.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, source code 123, intermediate representation 124, profile data 125, compiler 126, and machine code 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD-RW (e.g., 195 of FIG. 1), and transmission type media such as digital and analog communications links.

Figure 8:
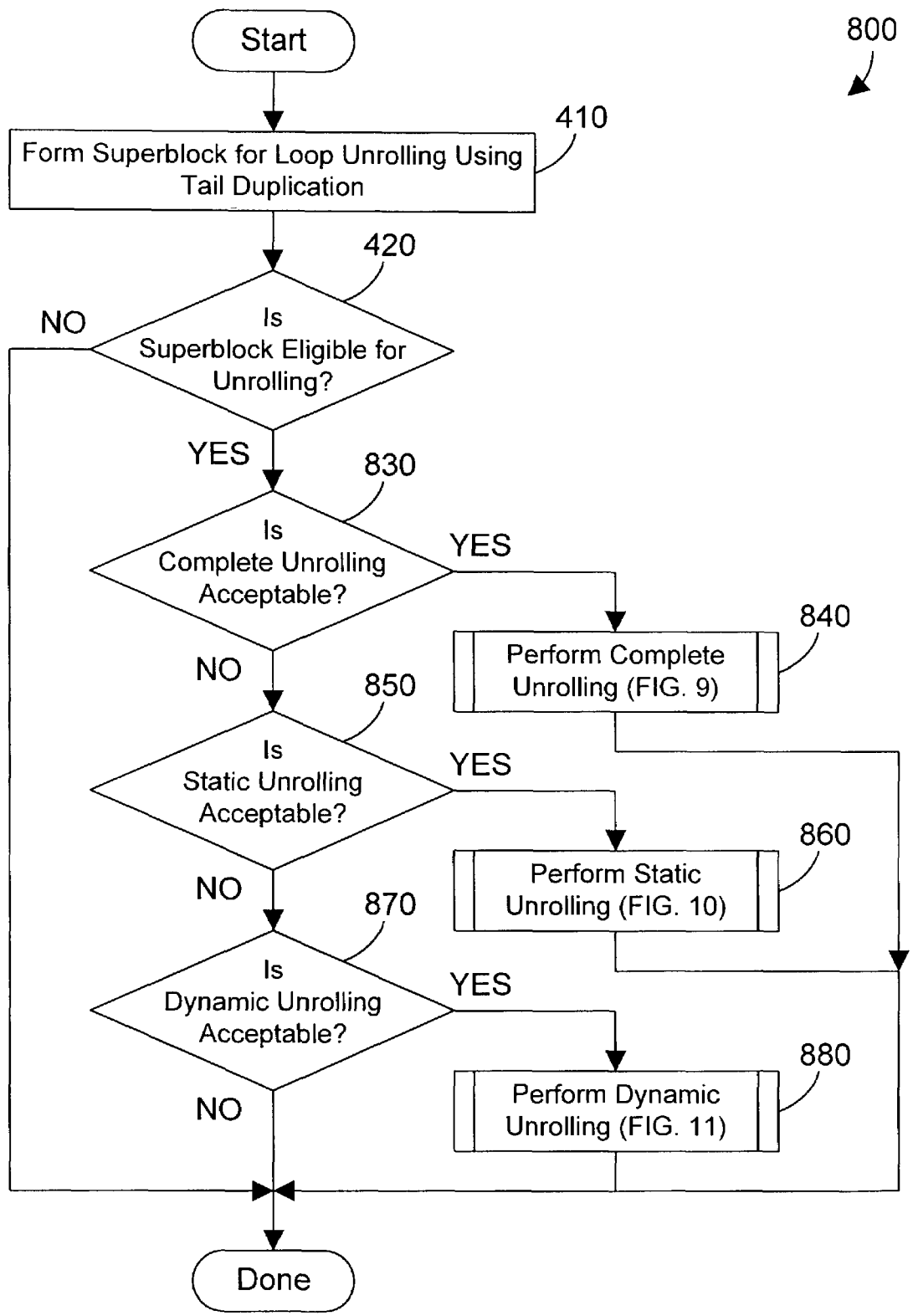
FIG. 8 is a flow diagram of a method for unrolling a superblock in accordance with the preferred embodiments.

We now turn to functions performed by the superblock unroller 127, which are shown in FIGS. 8–23. The count rectifier 128 in superblock unroller 127 assures that loop counters have correct values for each possible execution path in the loop. Referring now to FIG. 8, method 800 in accordance with the preferred embodiments allows for more types of unrolling of a superblock than provided in the prior art. First, a superblock is formed using tail duplication (step 410), which is the same step in prior art method 400 of FIG. 4. If the superblock is not eligible for unrolling (step 420=NO), method 800 is done. If the superblock is eligible for unrolling (step 420=YES), method 800 then makes a series of checks to determine what type of unrolling, if any, to perform on the superblock. If complete unrolling is acceptable (step 830=YES), complete unrolling is performed (step 840). If complete unrolling is not acceptable (step 830=NO), method 800 then checks to see if static unrolling is acceptable (step 850). If so (step 850=YES), static unrolling is performed (step 860). If static unrolling is not acceptable (step 850=NO), method 800 checks to see if dynamic unrolling is acceptable (step 870). If so (step 870=YES), dynamic unrolling is performed (step 880). If not (step 870=NO), method 800 is done. Note that the details of steps 840, 860, and 880 are shown in other figures, discussed in more detail below. A common feature in each of step 840, 860 and 880 is rectification of the loop counter value to account for leaving or re-entering the unrolled superblock.

Method 800 in FIG. 8 does not contain any step for performing trivial unrolling, such as is present in block 430 of FIG. 4, due to the limited value of performing trivial unrolling. However, one skilled in the art will recognize that trivial unrolling could be included as part of method 800 within the scope of the preferred embodiments.

Note that many steps in FIGS. 8–23 are steps that are expanded into multiple steps in subsequent figures. For example, step 840 in FIG. 8 is also shown as a method 840 in FIG. 9 that includes multiple steps. For this reason, the same numerical designator may be referenced as a step or a method, depending on which flow diagram is being referenced.

In the preferred embodiments, step 420 determines whether the loop has a single latch block, whether the superblock is small enough to be considered for unrolling, whether the superblock constitutes a complete loop iteration, and whether the loop count initialization and iteration conditions can be properly determined. Complete and static unrolling are only acceptable in steps 830 and 850 if the exact number of times the loop will iterate can be determined. And for all acceptability tests in steps 830, 850 and 870, unrolling is acceptable only if the amount of code duplication that would result from the unrolling does not exceed adjustable limits.

Figure 9:
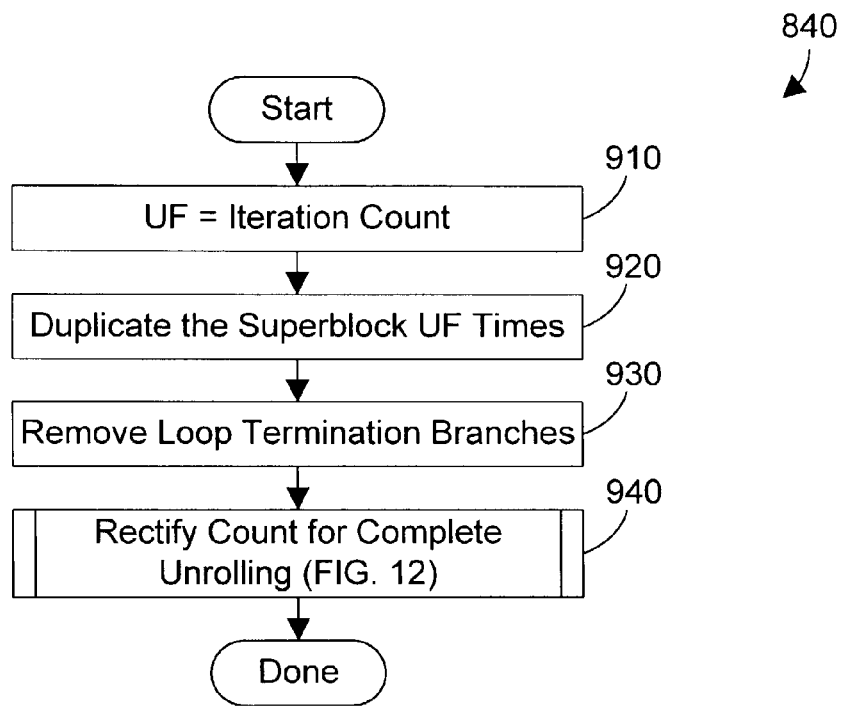
FIG. 9 is a flow diagram of a method for performing complete unrolling of the superblock in accordance with the preferred embodiments.

Steps in performing complete unrolling in step 840 of FIG. 8 are shown in FIG. 9. First, a variable that represents an unroll factor UF is assigned the value of the iteration count (step 910). The superblock is then duplicated UF times (step 920). Duplicating the superblock includes copying the instructions and updating the control flow. Loop termination branches are removed (step 930). The latching branch for every iteration can be removed because we know all iterations will be executed. And finally, the count must be rectified to account for complete unrolling (step 940).

Figure 12:
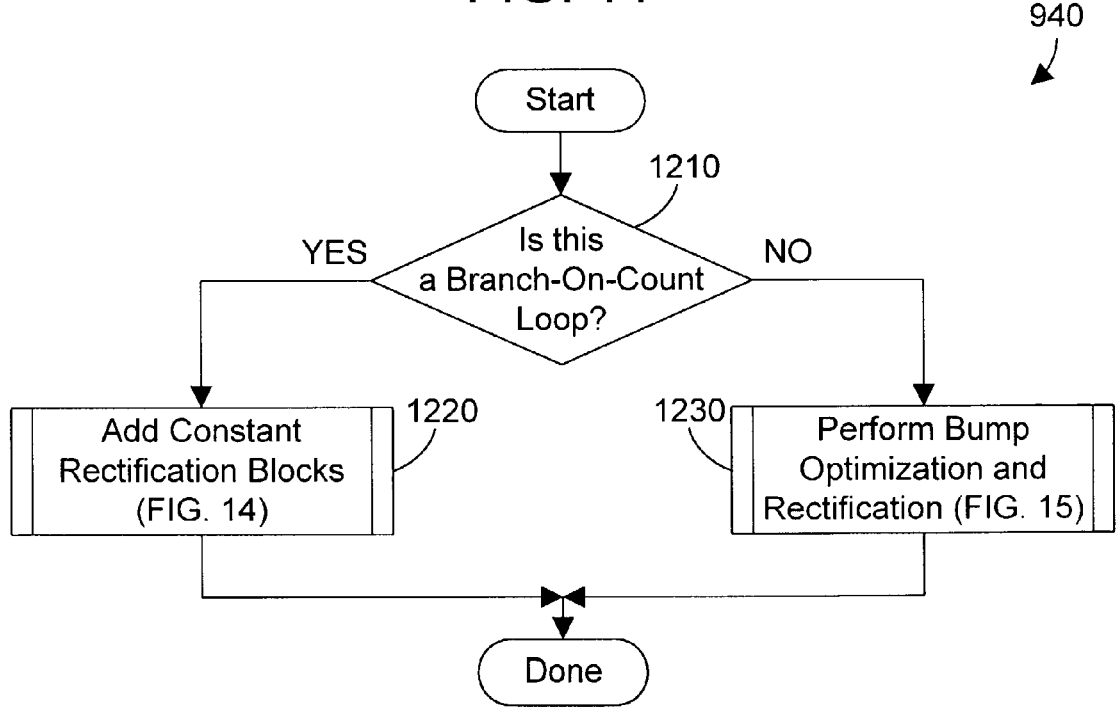
FIG. 12 is a flow diagram of a method for rectifying count for complete unrolling in accordance with the preferred embodiments.
Figure 14:
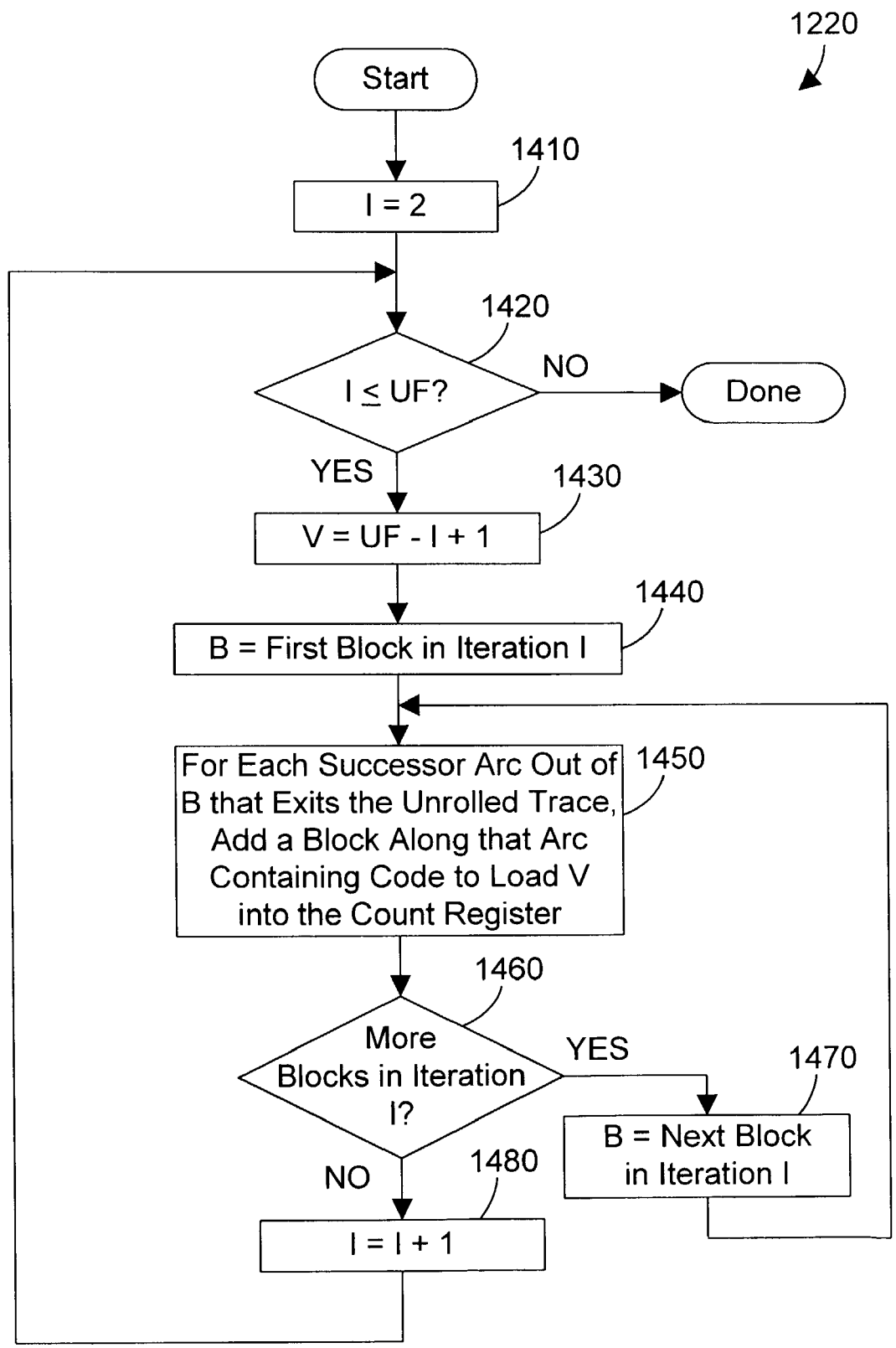
FIG. 14 is a flow diagram of a method for adding constant rectification blocks in accordance with the preferred embodiments.

Details of count rectification 940 in FIG. 9 are shown in FIG. 12. Many computer architectures have a branch-on-count instruction for optimizing loops using a special count register CTR. We assume an instruction that decrements the value of the count register, compares it with zero, and returns to the top of the loop if the value is non-zero. We assume that loops have already been optimized to use the branch-on-count instruction where appropriate. If the loop is a branch-on-count loop (step 1210=YES), constant rectification blocks are added (step 1220). Details of adding the constant rectification blocks in step 1220 are shown in FIG. 14. If the loop is not a branch-on-count loop (step 1210=NO), bump optimization and rectification are performed (step 1230). Details of bump optimization and rectification 1230 are shown in FIG. 15.

Referring to FIG. 14, the details of adding constant rectification blocks in step 1220 in FIG. 12 are shown. First, the counter I is initialized to two (step 1410). If the value of counter I is greater than the unroll factor UF (step 1420=NO), method 1220 is done. If the value of counter I is less than or equal to the unroll factor UF (step 1420=YES), a variable V is assigned the value of the unroll factor UF minus the iteration value I plus one (step 1430). B is then assigned to be the first block in iteration I (step 1440). For each successor arc out of B that exits the unrolled trace, a block is added along that arc that contains code to load the value of V into the count register. If there are more blocks in iteration I to process (step 1460=YES), B is assigned to the next block in iteration I, and control is passed to step 1450. If there are no more blocks in iteration I (step 1460=NO), the value of I is incremented by one (step 1480), and control is passed to step 1420. Method 1220 of FIG. 14 rectifies the count for complete unrolling of branch-on-count loops by loading the count register CTR with the number V of full and partial iterations remaining when leaving the superblock trace.

Figure 15:
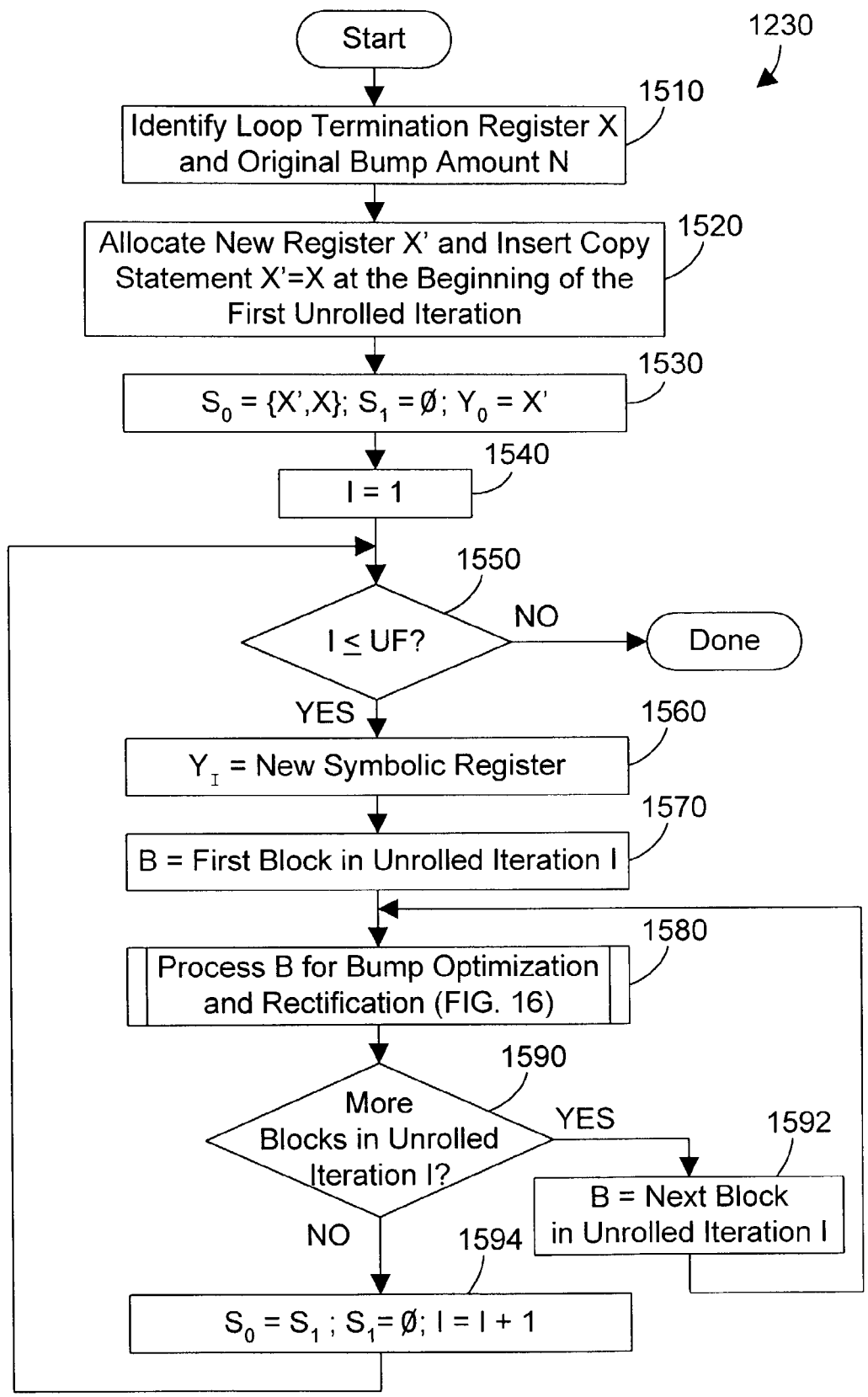
FIG. 15 is a flow diagram of a method for performing bump optimization and rectification in accordance with the preferred embodiments.

The details of performing bump optimization and rectification in step 1230 of FIG. 12 are shown in FIG. 15. Step 1230 is used for count rectification of loops that don't use the branch-on-count instruction, whether the loops are unrolled completely, statically, or dynamically. We know from the eligibility test in step 420 of FIG. 8 that the loop contains a single "bump instruction" that increments or decrements the value used to test for loop termination, and that the bump instruction is guaranteed to be executed each time the loop is executed. Unlike the branch-on-count instruction, though, the bump instruction can be separated from the test and branch. It may appear at the top of the loop, at the end of the loop, or somewhere in between. Also, the value computed by the bump instruction may be used by other computations in the loop, so we cannot blithely remove it or change its value without more analysis.

Ideally, a loop would have a bump instruction of the form X=X+N, where X is the loop termination register. But it is just as likely that we might have copy instructions scattered through the loop, such as: Y=X; Z=Y+N; X=Z. Of course, there are other more complicated possibilities as well that we must account for.

What would be preferable is to convert the UF copies of X=X+N into a single bump instruction X=X+(UF*N), and have the intervening bump expressions only executed on early exit from the loop to the backup loop (i.e., the original loop including tail-duplicated blocks). The way we do this is to change each bump instruction to target a new register $Y_I$, and add a copy from $Y_I$ to the loop termination register X along each exit arc. A later optimization phase will usually determine that $Y_I$ is only used along the exit arc(s), and push the bump instruction out to where the copies are. A complication with this scheme is that we have to be careful where in the loop the bump instruction comes, and use $Y_{I-1}$, if we exit prior to the bump instruction.

To facilitate this, we keep track of two sets of registers. $S_0$ contains all registers that have the same value as the loop termination register X prior to the bump instruction, and $S_1$ contains those registers equivalent to X following the bump instruction. At the beginning of each iteration, $S_0$ gets the old value of $S_1$, and $S_1$ becomes empty. Set $S_0$ contains a canonical representative $Rep(S_0)$ that is some register other than X. Set $S_1$ likewise contains a canonical representative $Rep(S_1)$ that is some register other than X. The idea is to remove uses of X from the loop insofar as possible, to facilitate motion of instructions involved in the bump calculation. We place a copy from X to a new register X' at the beginning of the loop. X' represents the initial value of X. All bump instructions will add a multiple of the initial bump value N to X', rather than adding the bump value to X.

Figure 16:
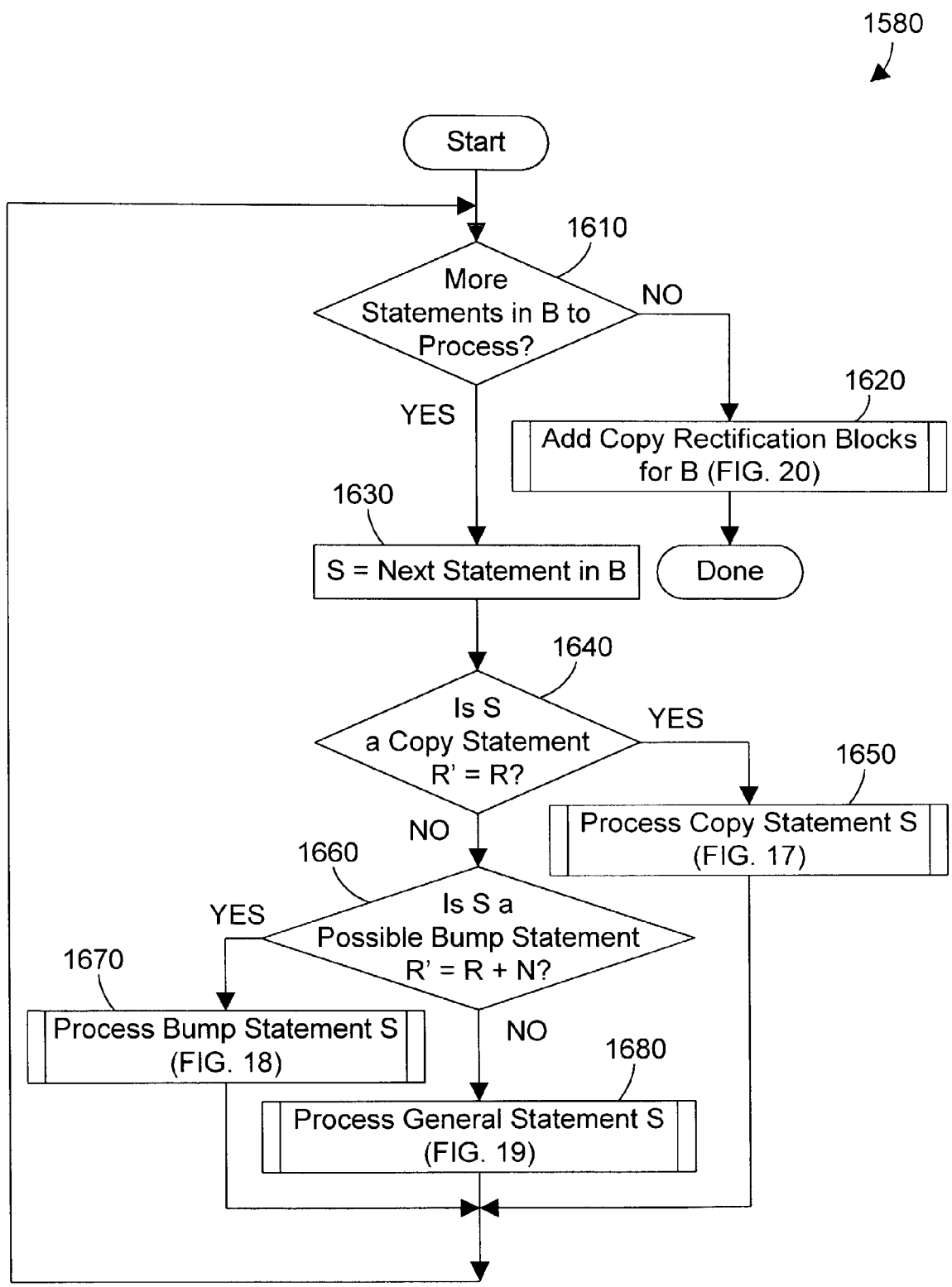
FIG. 16 is a flow diagram of a method for processing a block for bump optimization and rectification in accordance with the preferred embodiments.

We now turn to FIG. 15 for a description of the detailed steps in implementing the bump optimization and rectification 1230 in FIG. 12. First, loop termination register X and original bump amount N are identified (step 1510). A new register X' is allocated, and a copy statement X'=X is inserted at the beginning of the first unrolled iteration (step 1520). Set $S_0$ is initialized to contain X' and X; set $S_1$ is initialized to null; and a new register $Y_0$ is initialized to the value of X' (step 1530). I is then set to a value of one (step 1540). If I is greater than the unroll factor UF (step 1550=NO), method 1230 is done. If I is less than or equal to the unroll factor UF (step 1550=YES), a new symbolic register $Y_I$ is allocated (step 1560), and B is set to the first block in unrolled iteration I (step 1570). B is then processed for bump optimization and rectification (step 1580). Note that the details of step 1580 are shown in FIG. 16. If there are more blocks in the unrolled iteration I (step 1590=YES), B is set to the next block in the unrolled iteration I (step 1592), and control is passed to step 1580. If there are no more blocks in unrolled iteration I (step 1590=NO), $S_1$ is copied to $S_0$; $S_1$ is set to null; and I is incremented by one (step 1594). At this point, control is passed to step 1550, and processing continues.

Figure 17:
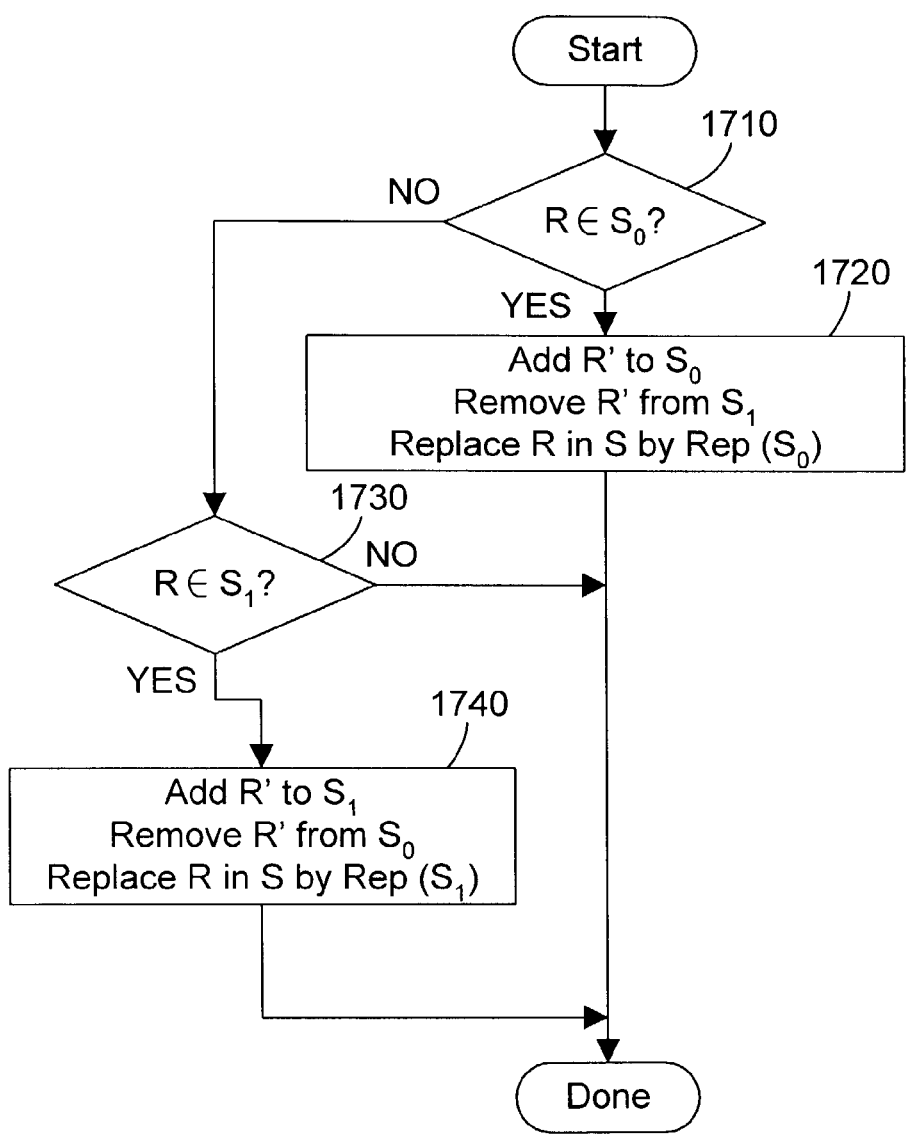
FIG. 17 is a flow diagram of a method for processing a copy statement in accordance with the preferred embodiments.
Figure 18:
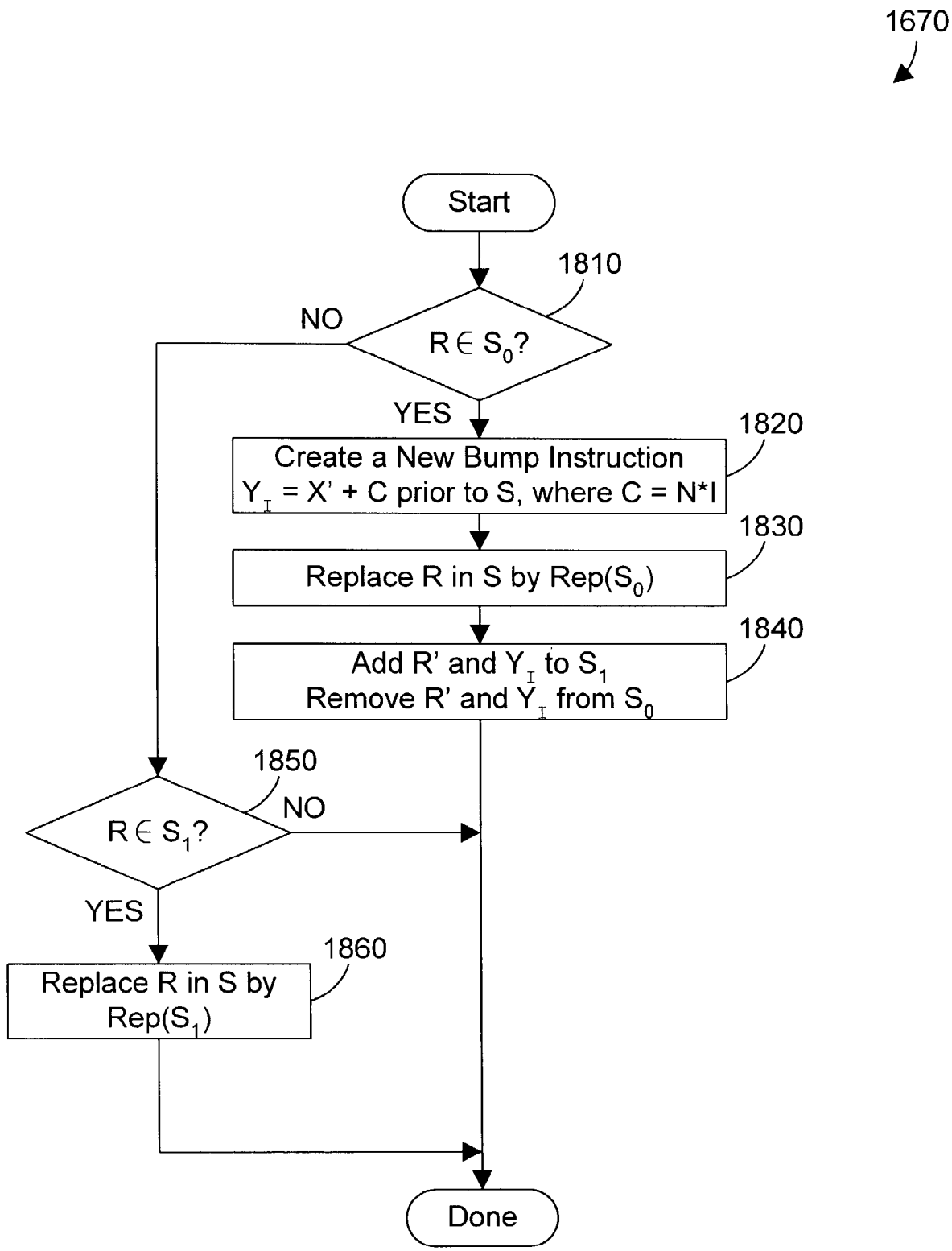
FIG. 18 is a flow diagram of a method for processing a bump statement in accordance with the preferred embodiments.
Figure 19:
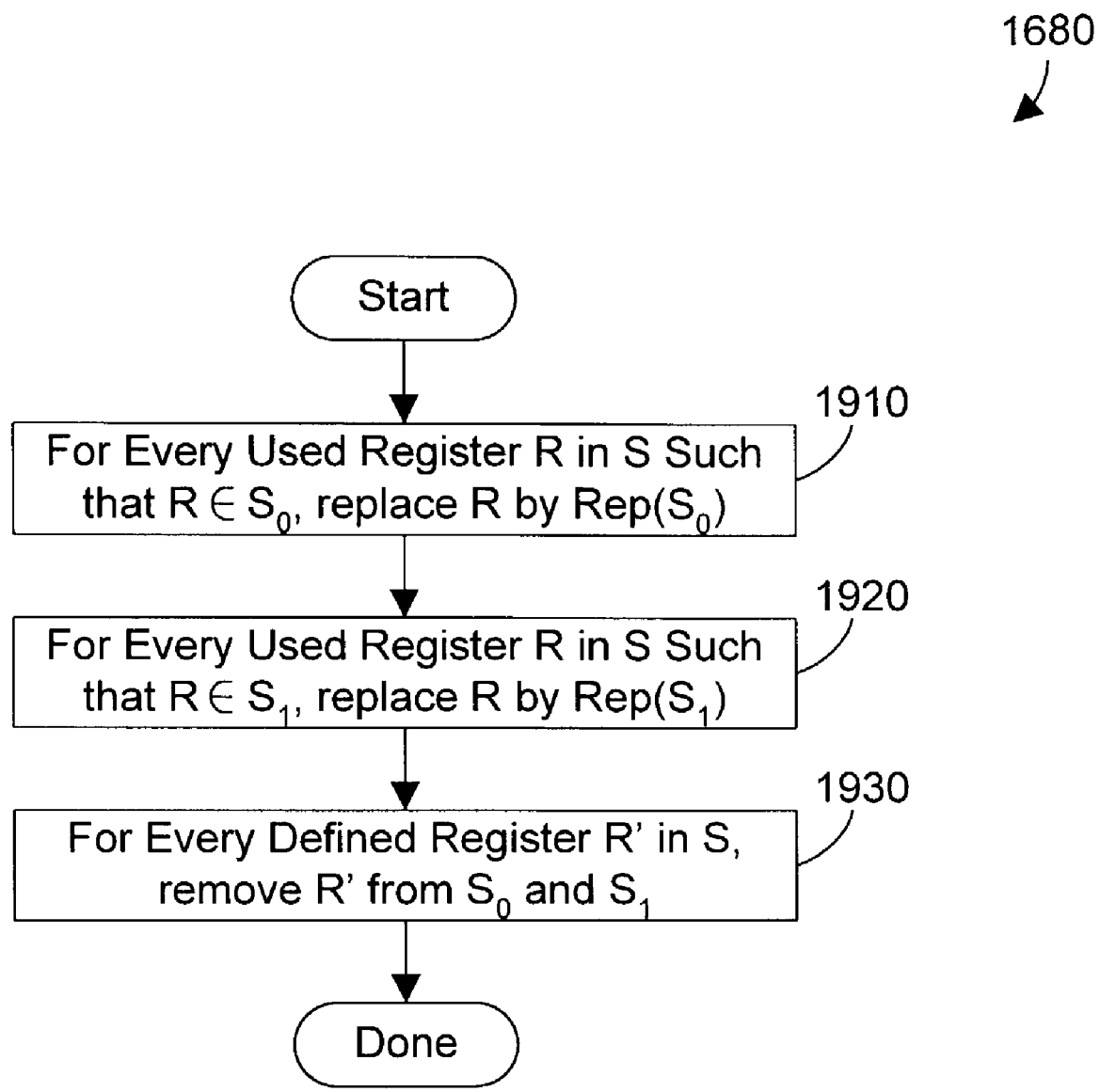
FIG. 19 is a flow diagram of a method for processing a general statement in accordance with the preferred embodiments.
Figure 20:
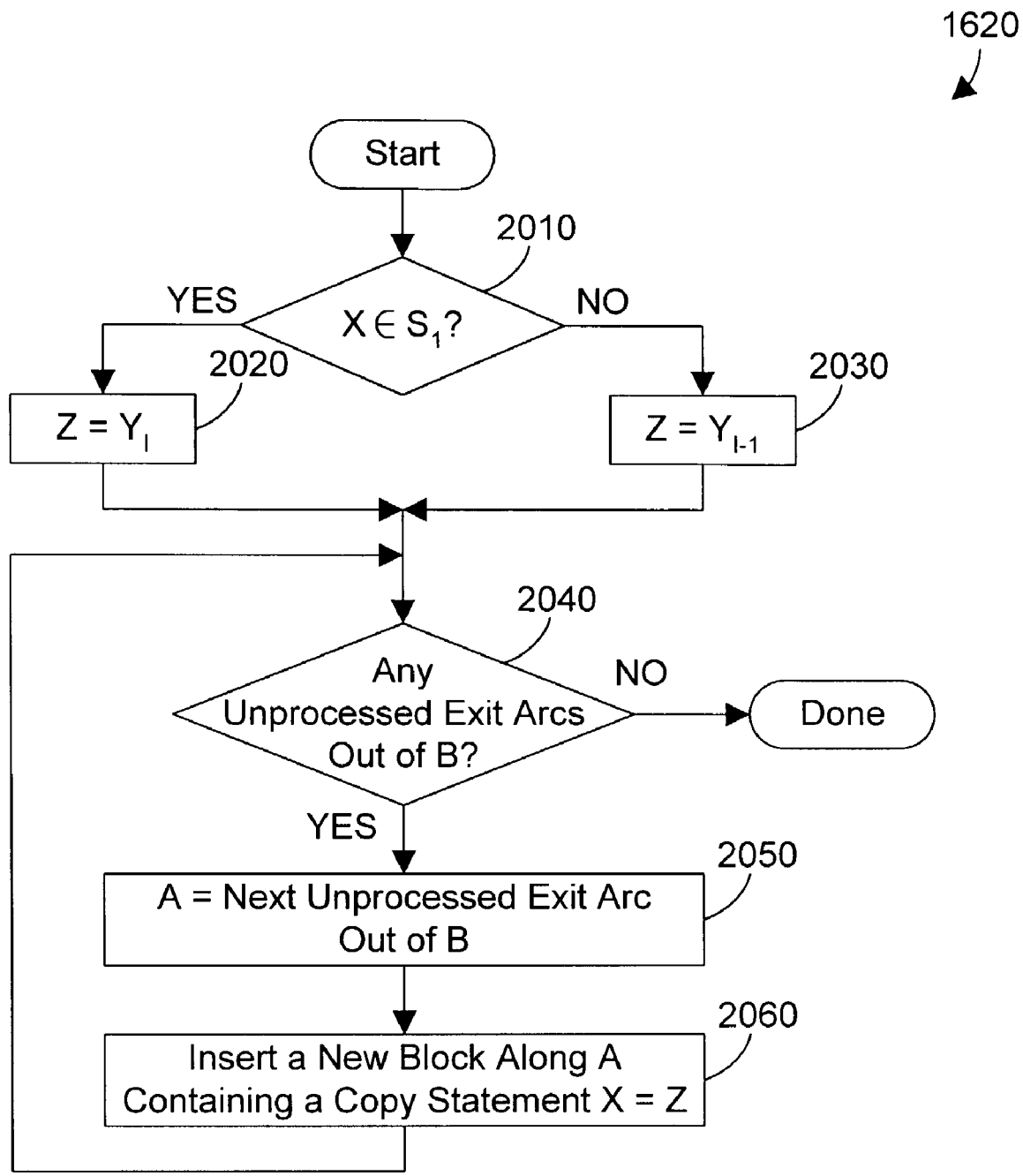
FIG. 20 is a flow diagram of a method for adding copy rectification blocks for a selected block in accordance with the preferred embodiments.

The processing of a block B for bump optimization and rectification in step 1580 is shown in more detail in FIG. 16. There are more statements in B to process (step 1610=YES), so S is set to the first statement in B (step 1630). If S is a copy statement of the form R'=R (step 1640=YES), the copy statement is processed (step 1650). Note that the details of processing the copy statement in step 1650 are shown in FIG. 17. If S is not a copy statement of the form R'=R (step 1640=NO), we check to see if S is a possible bump statement (step 1660). If so (step 1660=YES), the bump statement S is processed (step 1670). Details of the processing of bump statement S in step 1670 are shown in FIG. 18. If S is not a possible bump statement (step 1660=NO), the general statement S is processed (step 1680). The details of processing a general statement in step 1680 are shown in FIG. 19. If there are more statements in B to process (step 1610=YES), S is set to the next statement in B (step 1630), and processing continues at step 1640. If there are no more statements in B (step 1610=NO), copy rectification blocks for B are added (step 1620). Details of step 1620 in FIG. 16 are shown in FIG. 20.

The processing of a copy statement S in step 1650 of FIG. 16 is shown in more detail in FIG. 17. If R is not an element of set $S_0$ (step 1710=NO), and is not an element of $S_1$ (step 1730=NO), method 1650 is done. If R is an element of set $S_0$ (step 1710=YES), R' is added to set $S_0$, R' is removed from $S_1$, and R is replaced in S by a canonical representative $Rep(S_0)$. If R is not an element of set $S_0$ (step 1710=NO), but is an element of set $S_1$ (step 1730=YES), R' is added to set $S_1$, R' is removed from set $S_0$, and R is replaced in S by a canonical representative $Rep(S_1)$.

Now we consider the details of processing the bump statement S in step 1670 of FIG. 16, which are shown in FIG. 18. Note that S has been determined to be of the form R'=R+N in step 1660 of FIG. 16. If R is not an element of set $S_0$ (step 1810=NO), and is not an element of set $S_1$ (step 1850=NO), method 1670 is done. If R is an element of $S_0$ (step 1810=YES), a new bump instruction $Y_I$=X'+C is created prior to S, where C=N*I (step 1820). Next, R in S is replaced by a canonical representative $Rep(S_0)$ (step 1830). R' and $Y_I$ are then added to $S_1$, and R' and $Y_I$ are removed from $S_0$ (step 1840). If R is not an element of $S_0$ (step 1810=NO), but is an element of $S_1$ (step 1850=YES), R is replaced in S by a canonical representative $Rep(S_1)$ (step 1860).

The details of processing the general statement S in step 1680 of FIG. 16 are shown in FIG. 19. For every used register R in S such that R is an element of set $S_0$, replace R by a canonical representative $Rep(S_0)$ (step 1910). For every used register R in S such that R is an element of set $S_1$, replace R by a canonical representative $Rep(S_1)$ (step 1920). And for every defined register R' in S, remove R' from $S_0$ and $S_1$ (step 1930).

Details of adding copy rectification blocks in step 1620 of FIG. 16 are shown in FIG. 20. If X is an element of set $S_1$ (step 2010=YES), a variable Z is assigned the value of $Y_I$ (step 2020). If X is not an element of set $S_1$ (step 2010=NO), Z is assigned the value of $Y_{I-1}$ (step 2030). If there are unprocessed exit arcs out of B (step 2040=YES), A is set to the next unprocessed exit arc out of B (step 2050), and a new block is inserted along A that contains a copy statement X=Z (step 2060). Processing then resumes at step 2040, and processing continues until all exit arcs out of B have been processed (step 2040=NO).

Figure 10:
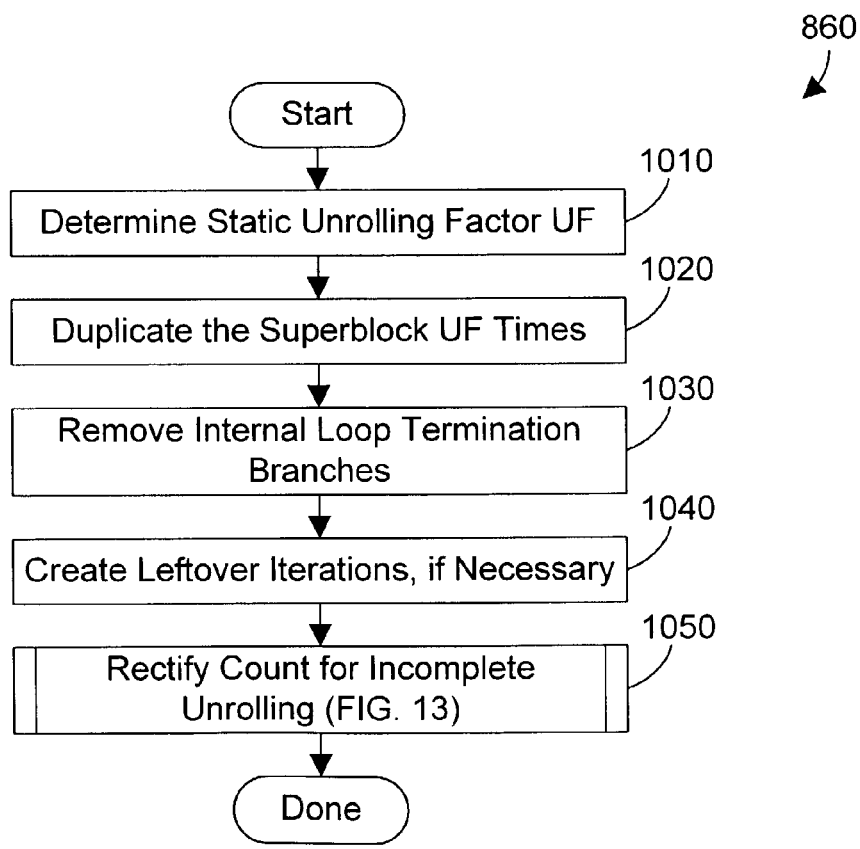
FIG. 10 is a flow diagram of a method for performing static unrolling of the superblock in accordance with the preferred embodiments.

Steps in performing static unrolling in step 860 of FIG. 8 are shown in FIG. 10. First, a static unrolling factor UF is determined using one or more suitable heuristics (step

1010). The heuristics for determining the unrolling factor UF may restrict the total number of iterations unrolled and the total number of instructions duplicated. The heuristics may also limit the unrolling factor by the likelihood that a superblock will be exited before it reaches the latching branch. In addition, the heuristics may limit the number of leftover iterations required. Once the unrolling factor UF has been determined, the superblock is then duplicated UF times (step 1020). Duplicating the superblock includes copying the instructions and updating the control flow. Internal loop termination branches are removed (step 1030). The latching branch for every iteration except the last can be removed in step 1030. Any required leftover iterations are then created (step 1040). If the total number of iterations is not exactly divisible by the unrolling factor UF, leftover iterations are placed before the unrolled loop to make up the difference. Leftover iterations are also duplicates of the superblock, not the whole loop. Finally, the count must be rectified to account for incomplete unrolling (step 1050).

Figure 13:
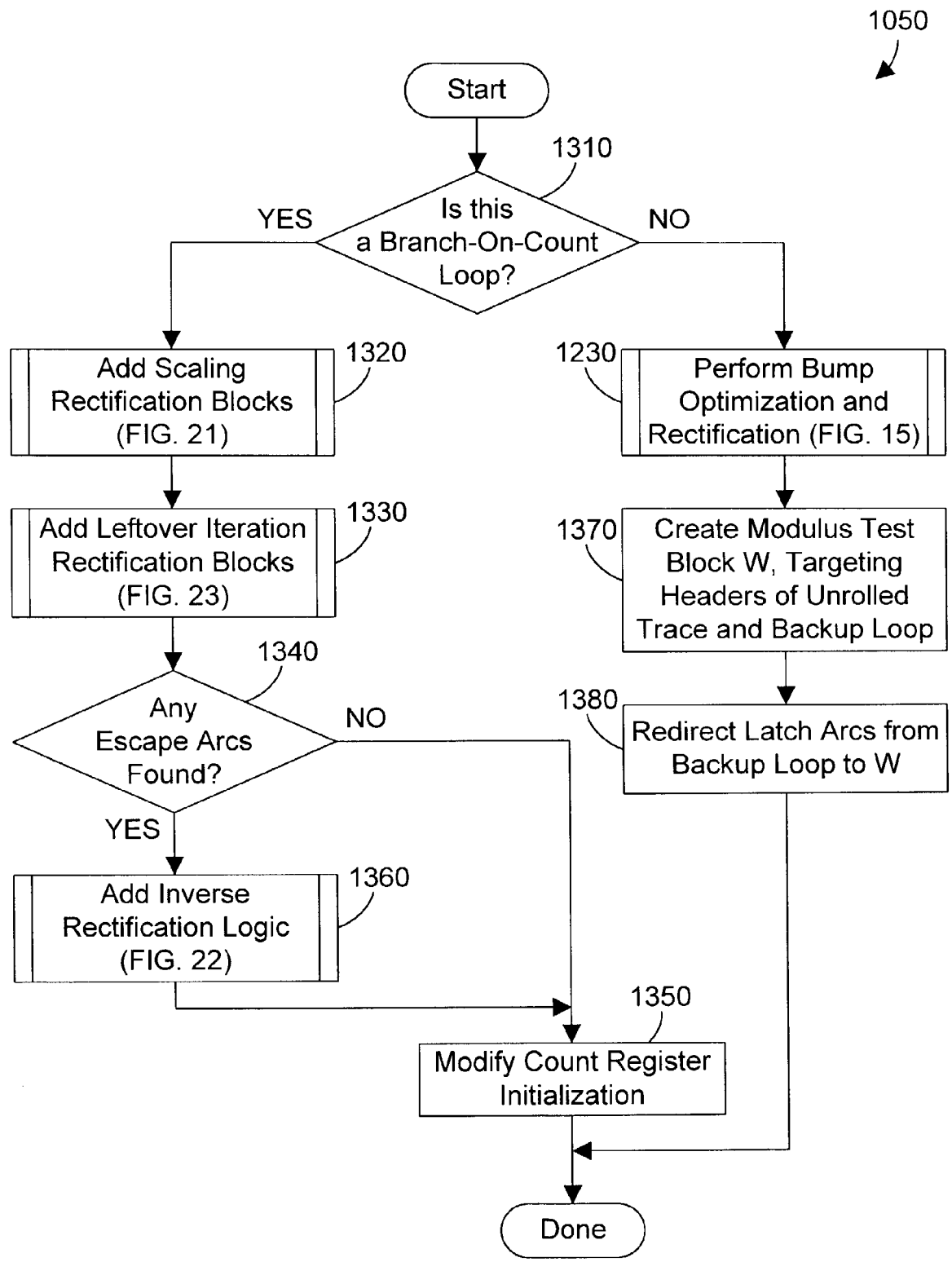
FIG. 13 is a flow diagram of a method for rectifying count for incomplete unrolling in accordance with the preferred embodiments.

Details of the count rectification for incomplete unrolling in step 1050 in FIG. 10 are shown in FIG. 13. If the loop is a branch-on-count loop (step 1310=YES), scaling rectification blocks are added (step 1320) and leftover iteration rectification blocks are added (step 1330). If any escape arcs are found (step 1340=YES), inverse rectification logic is added (step 1360). At this point, the count register initialization is modified (step 1350). If no escape arcs are found (step 1340=NO), the count register initialization is modified (step 1350) without the need of adding inverse rectification logic in step 1360.

If the loop is not a branch-on-count loop (step 1310=NO), bump optimization and rectification is performed (step 1230), which is discussed in detail above with reference to FIG. 12. A modulus test block W is then created, which targets headers of the unrolled trace and the backup loop (step 1370). Block W contains code to compute X mod UF, where X is the loop termination register used in method 1230 of FIG. 12, and UF is the unroll factor for this loop. The latch arcs from the backup loop are then redirected to block W (step 1380). This causes the loop to branch to the header of the unrolled superblock if the modulus test in block W returns zero, and to branch to the header of the backup loop otherwise. This ensures that control will return to the unrolled loop trace as soon as possible.

Figure 21:
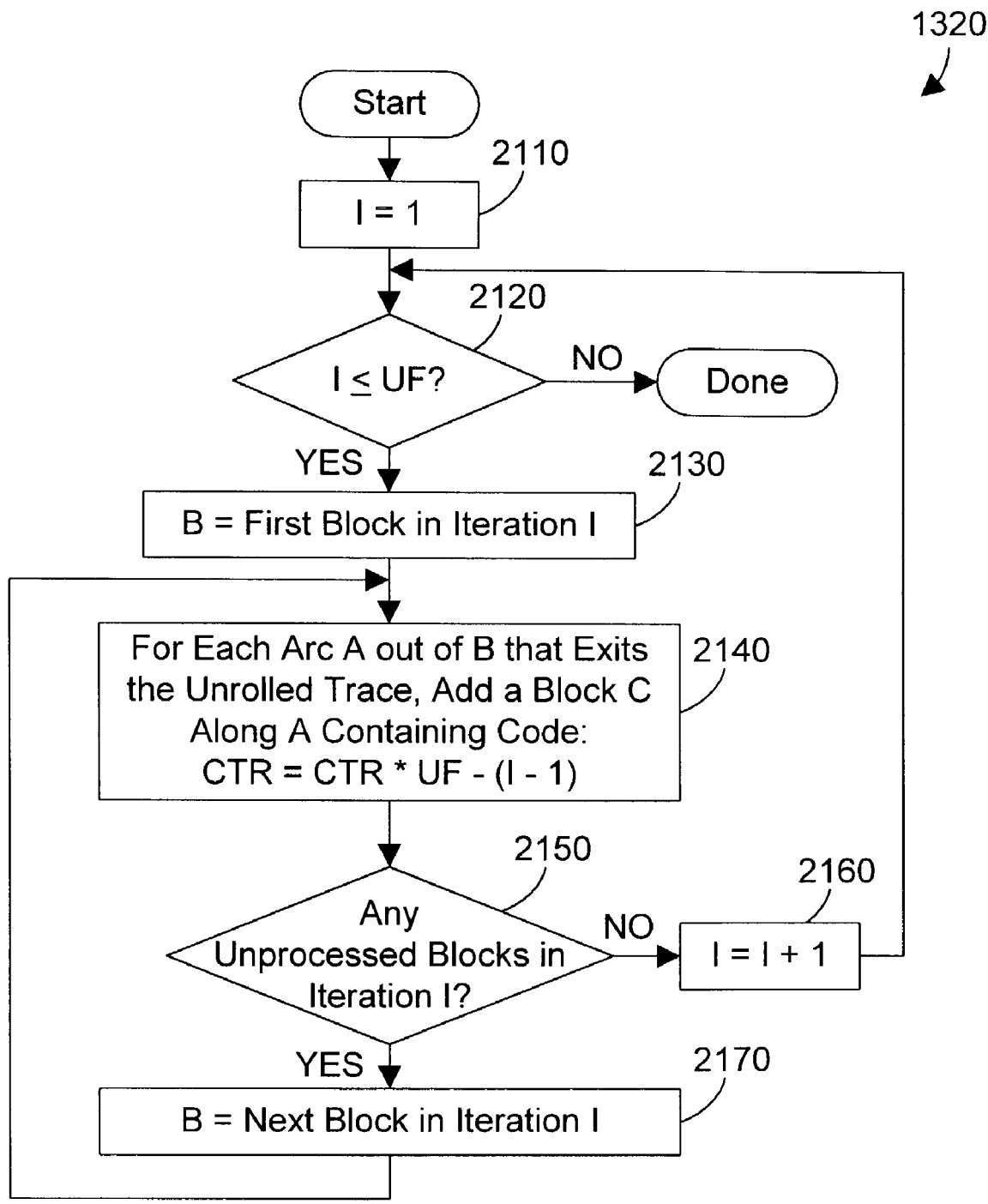
FIG. 21 is a flow diagram of a method for adding scaling rectification blocks in accordance with the preferred embodiments.

Referring back to FIG. 13, details of step 1320 that adds scaling rectification blocks is shown in FIG. 21. Step 1320 is performed for branch-on-count loops that cannot be completely unrolled. First, I is set to a value of one (step 2110). If I is greater than the unroll factor UF (step 2120=NO), method 1320 is done. If I is less than or equal to the unroll factor UF (step 2120=YES), B is set to the first block in iteration I (step 2130). For each arc A out of B that exits the unrolled trace, a block C that contains the code CTR=CTR*UF−(I−1) is added along A (step 2140). If there are any unprocessed blocks in iteration I (step 2150=YES), B is set to the next block in iteration I (step 2170), and processing continues at step 2140. If all blocks in iteration I have been processed (step 2150=NO), I is incremented by one (step 2160), and processing continues at step 2120.

Figure 22:
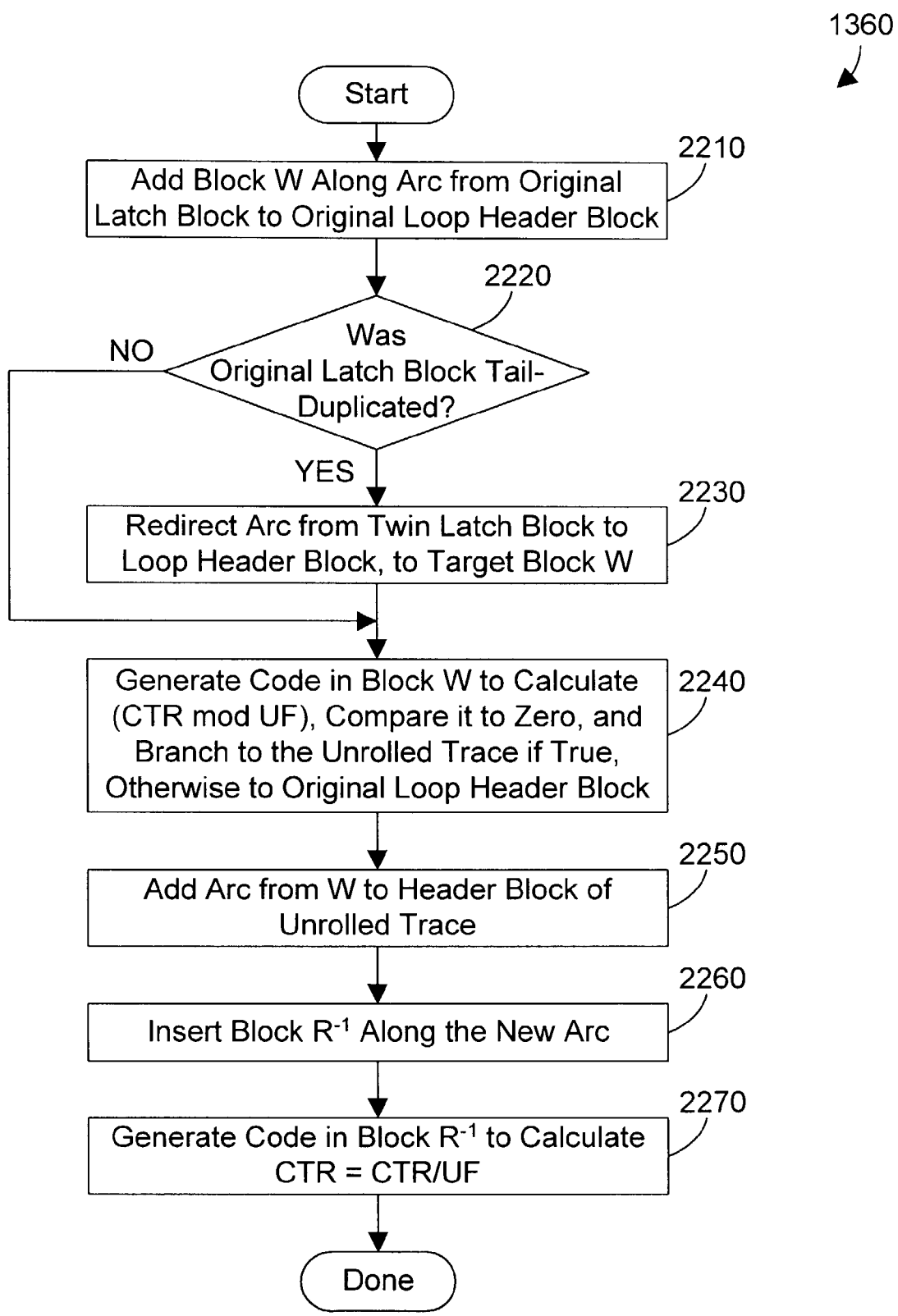
FIG. 22 is a flow diagram of a method for adding inverse rectification logic in accordance with the preferred embodiments.

Details of the addition of inverse rectification logic in step 1360 of FIG. 13 are shown in FIG. 22. First, a block W is added along the arc from the original latch block to the original loop header block (step 2210). If the original latch block was not tail-duplicated (step 2220=NO), control passes to step 2240. If the original latch block was tail-duplicated (step 2220=YES), the arc from the twin latch block to the loop header block is redirected to target block W instead (step 2230). Code is then generated in block W to perform the following steps: calculate the modulus of the counter CTR with respect to the unroll factor UF; compare CTR mod UF to zero; branch to the unrolled trace if CTR mod UF is zero, otherwise branch to the original loop header block (step 2240). An arc is then added from W to the header block of the unrolled trace (step 2250). A block $R^{-1}$ is then inserted along the new arc (step 2260). Code is then generated in block $R^{-1}$ to calculate CTR=CTR/UF (step 2270).

Figure 23:
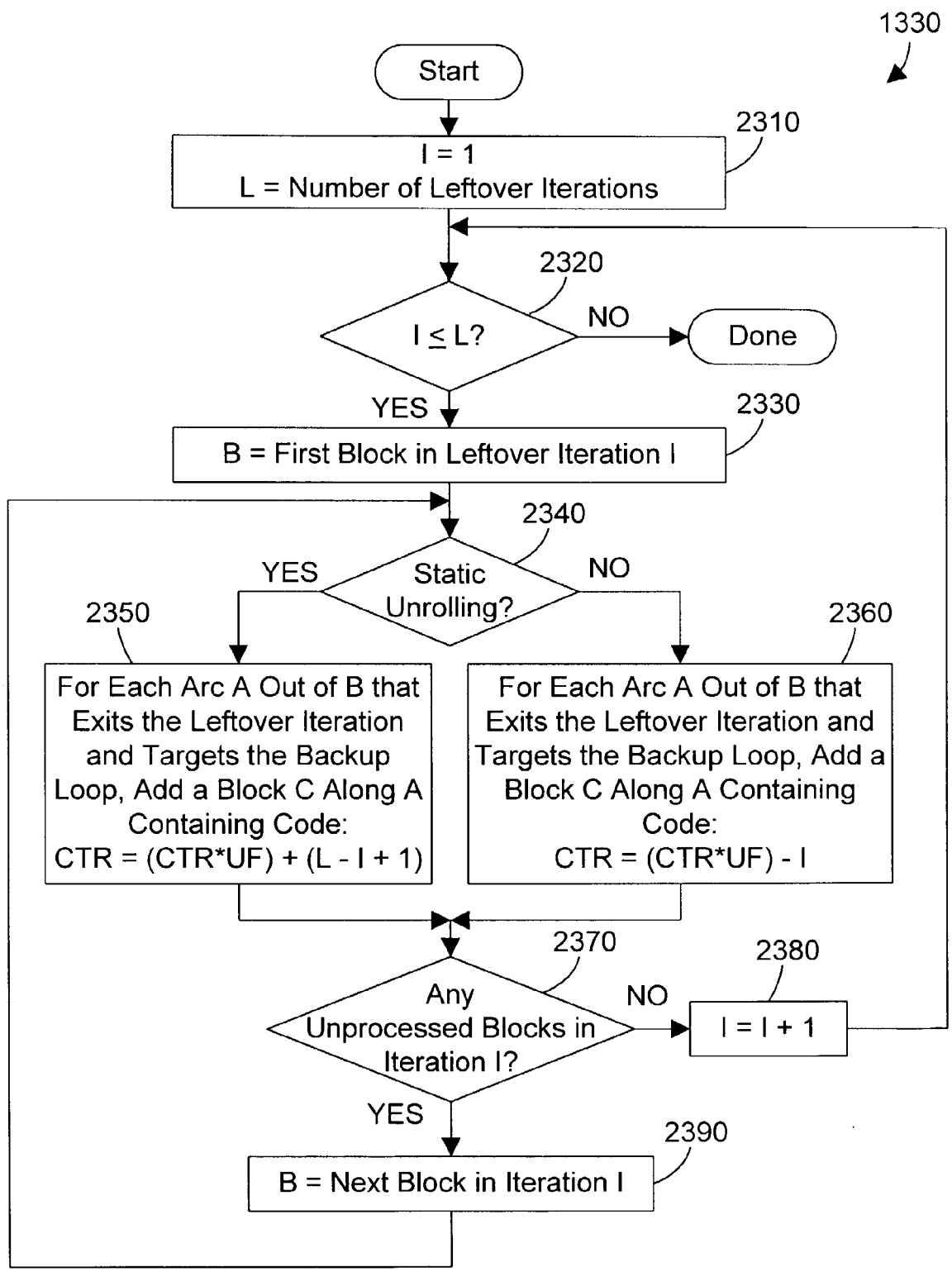
FIG. 23 is a flow diagram of a method for adding leftover iteration rectification blocks in accordance with the preferred embodiments.

Details of step 1330 in FIG. 13 are shown in FIG. 23. First, I is set to one, and L is set to the number of leftover iterations (step 2310). If I is greater than L (step 2320=NO), method 1330 is done. If I is less then or equal to L (step 2320=YES), B is set to the first block in leftover iteration I (step 2330). If static unrolling was performed (step 2340=YES), for each arc A out of B that exits the leftover iteration and targets the backup loop, add a block C that contains the code CTR=(CTR*UF)−1 along arc A. If static unrolling was not performed (step 2340=NO), for each arc A out of B that exits the leftover iteration and targets the backup loop, add a block C that contains the code CTR=(CTR*UF)+(2*(L−I+1)) along arc A. If there are still unprocessed blocks in iteration I (step 2370=YES), B is set to the next block in iteration I (step 2390), and processing continues at step 2340. Once all blocks in iteration I have been processed (step 2370=NO), I is incremented by one (step 2380), and processing continues at step 2320.

Figure 11:
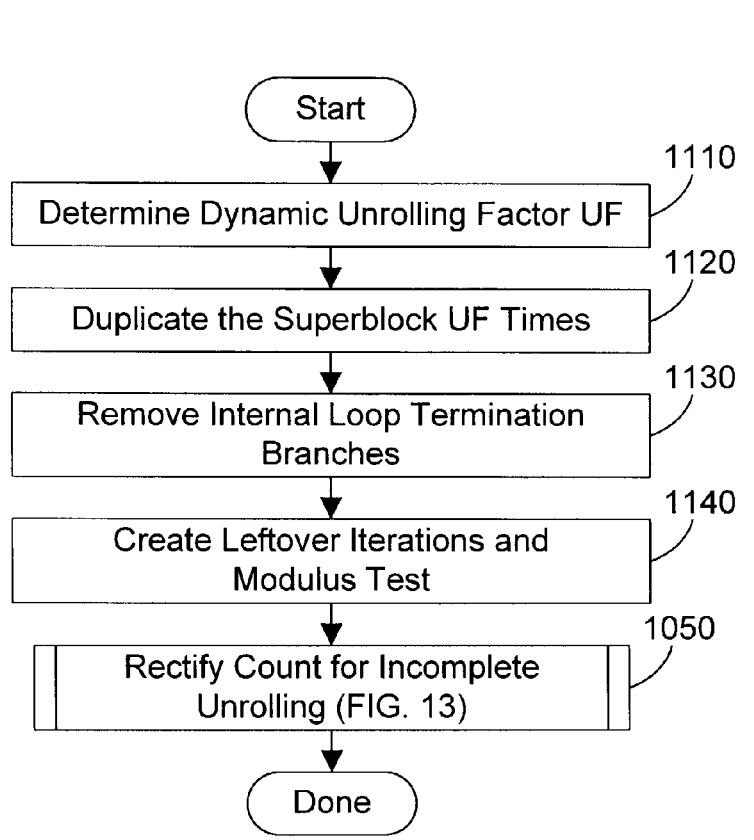
FIG. 11 is a flow diagram of a method for performing dynamic unrolling of the superblock in accordance with the preferred embodiments.

Steps in performing dynamic unrolling in step 880 of FIG. 8 are shown in FIG. 11. First, a dynamic unrolling factor UF is determined using one or more suitable heuristics (step 1110), which may be more restrictive than the heuristics used to determine the static unrolling factor in step 1010 of FIG. 10. Once the unrolling factor UF has been determined, the superblock is then duplicated UF times (step 1120). Duplicating the superblock includes copying the instructions and updating the control flow. Internal loop termination branches are removed (step 1130). The latching branch for every iteration except the last can be removed in step 1130. Any required leftover iterations and a modulus test are then created (step 1140). If the total number of iterations is not exactly divisible by the unrolling factor UF, leftover iterations are placed before the unrolled loop to make up the difference. For dynamic unrolling, we create UF−1 leftover iterations preceding the loop. Prior to these we place code to determine the total number of iterations T at runtime, and determine the remainder of T modulo UF. The result causes us to branch to the appropriate leftover iteration to ensure this number of leftover iterations is executed prior to the unrolled loop. Finally, the count must be rectified to account for incomplete unrolling (step 1050), which is discussed above in detail with respect to step 1050 in FIG. 10.

Figure 24:
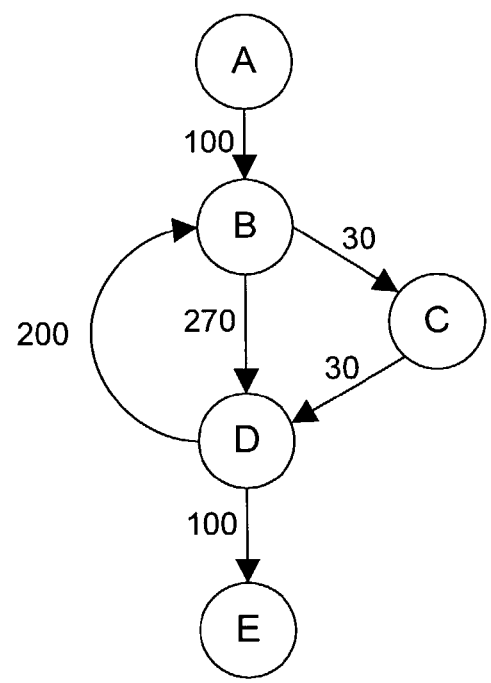
FIG. 24 is a sample control flow graph.

We now present examples to illustrate the methods presented in FIGS. 8–23. FIG. 24 shows a sample control flow graph of a portion of code that includes five basic blocks, A, B, C, D and E. The execution frequencies for each arc in FIG. 24 is shown numerically next to the arc. In the preferred embodiments, these execution frequencies are determined from profile data 125. We assume this is a branch-on-count loop, with the count register CTR initialized to 3 in block A, and a "bcf" instruction in block D. The bcf instruction is defined in the PowerPC instruction set, and when executed, it decrements the count register CTR, and branches if the result is non-zero. Note from the execution frequencies that the hot trace through the loop contains blocks B and D. This loop is always executed exactly three times. With these assumptions, we now turn to method 800 in FIG. 8.

Figure 25:
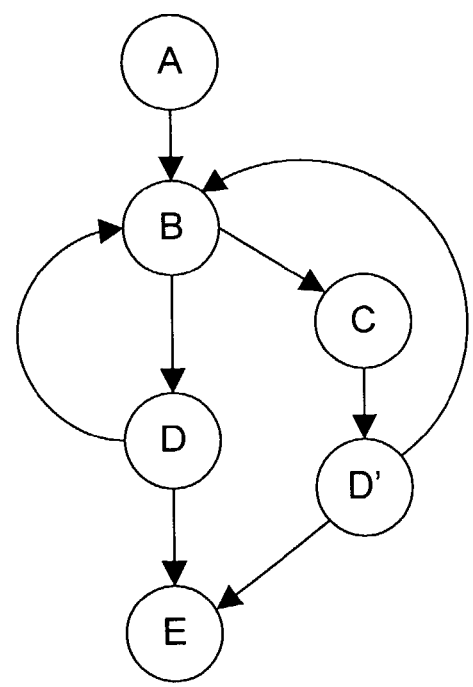
FIG. 25 is the sample control flow graph of FIG. 25 after superblock formation in accordance with the preferred embodiments.

A superblock is formed using tail duplication in step 410 by duplicating D', with the result shown in FIG. 25. The execution frequencies in FIG. 24 are needed to determine the hot trace, which dictates how the superblock is formed. Once the superblock is formed, the execution frequencies need not be shown, so they are not shown in FIGS. 25–27. For the superblock shown in FIG. 25, we assume it is eligible for unrolling (step 420=YES), and that complete unrolling is acceptable (step 830=YES). We then perform complete unrolling (step 840), which is shown in detail in FIG. 9.

With the assumption that the loop always executes three times, the unroll factor UF is set to three (step 910). The superblock is then duplicated three times (step 920), and the loop termination branches are removed (step 930), resulting in the control flow graph shown in FIG. 26. The duplicates for unrolling three times are B1, D1, B2, D2, B3 and D3. Blocks B, C, D and D' form the backup loop. We then perform the count rectification for complete unrolling (step 940), shown in detail in FIG. 12.

Figure 26:
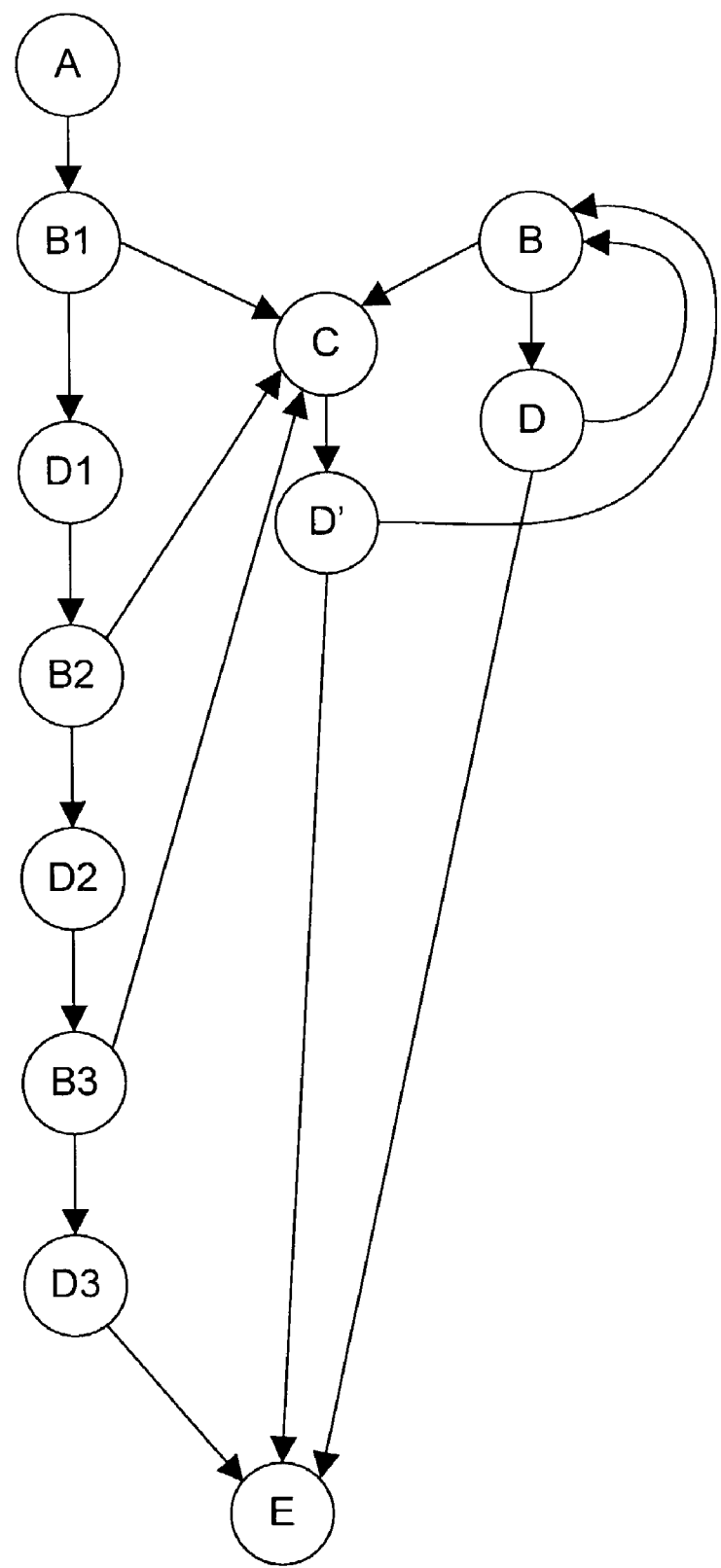
FIG. 26 is a sample control flow graph after completely unrolling the superblock of FIG. 25 three times.
Figure 27:
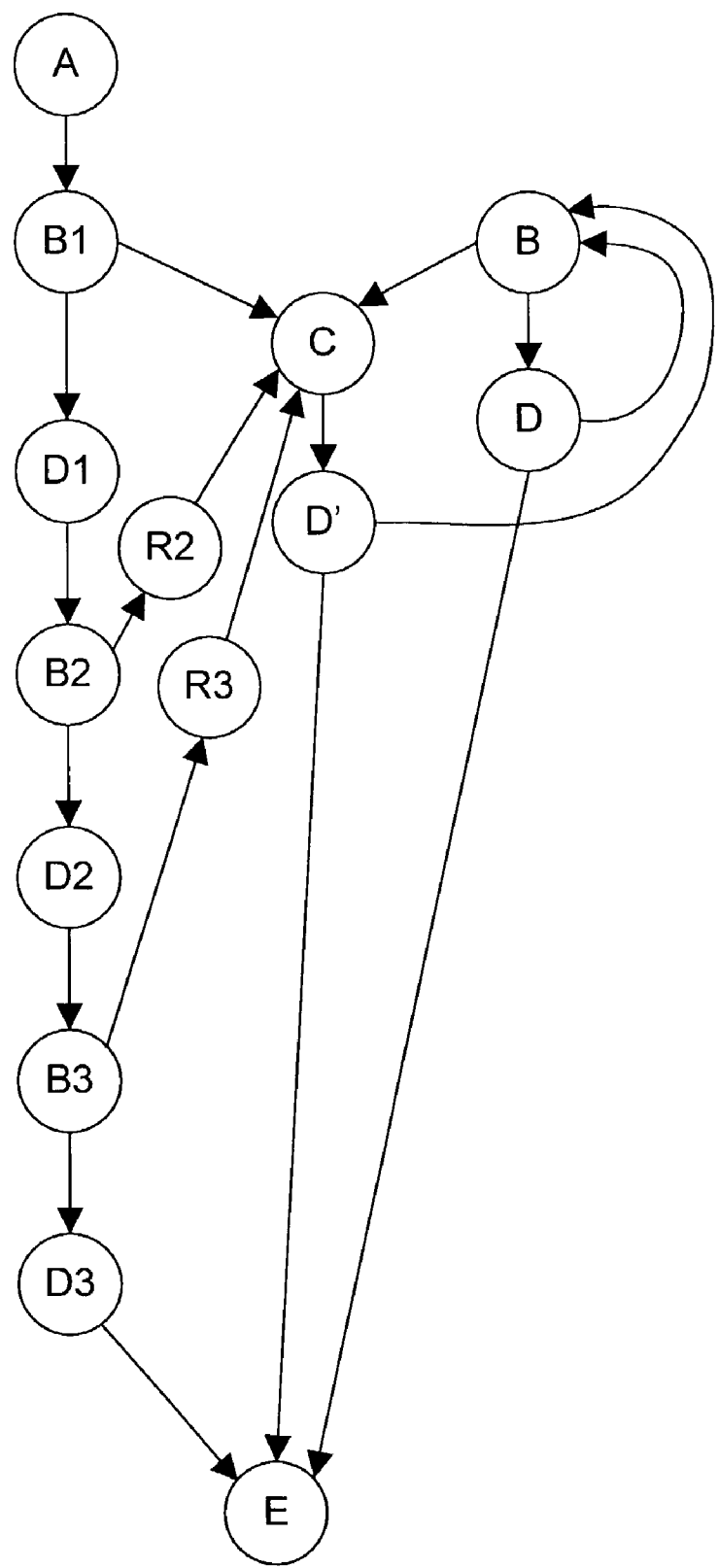
FIG. 27 is a control flow graph of FIG. 26 after the addition of count rectification code in accordance with the preferred embodiments.

We assumed this is a branch-on-count loop (step 1210=YES), so we need to add constant rectification blocks (step 1220), which is shown in detail in FIG. 14. I is set to two (step 1410). Two is less than the unroll factor UF of three (step 1420=YES), so V is set to a value of (3−2+1) or two (step 1430). B is set to the first block in the second iteration (step 1440), which is B2 for the example in FIG. 26. Step 1450 then adds block R2 between B2 and C, where R2 includes code to load 2 into the counter CTR. There are still more blocks in the second iteration (step 1460=YES), so B is set to the next block D2 in the second iteration (step 1470). In step 1450, for block D2, there are no arcs that exit the unrolled trace, so nothing is done. There are no more blocks in the second iteration (step 1460=NO), so I is incremented to 3 (step 1480). I is still less than or equal to the unroll factor of three (step 1420=YES), so V is set to a value of one, and B is set to block B3, the first block in the third iteration. In step 1450, a block R3 is added between B3 and C, where R3 includes code to load 1 into the counter CTR. There are more blocks in the third iteration (step 1460=YES), so B is set to the next block in the third iteration, namely D3. In step 1450, for D3, there are no arcs that exit the unrolled trace, so nothing is done. There are no more blocks in the third iteration (step 1460=NO), so I is incremented to 4 (step 1480). Step 1420 is now NO, so method 1220 is done. The result of completely unrolling the superblock of FIG. 26 is shown in FIG. 27. Note that blocks R2 and R3 contain count rectification code that adjusts the counter CTR to account for leaving the hot trace to execute the less-frequently executed code in the backup loop.

Figure 28:
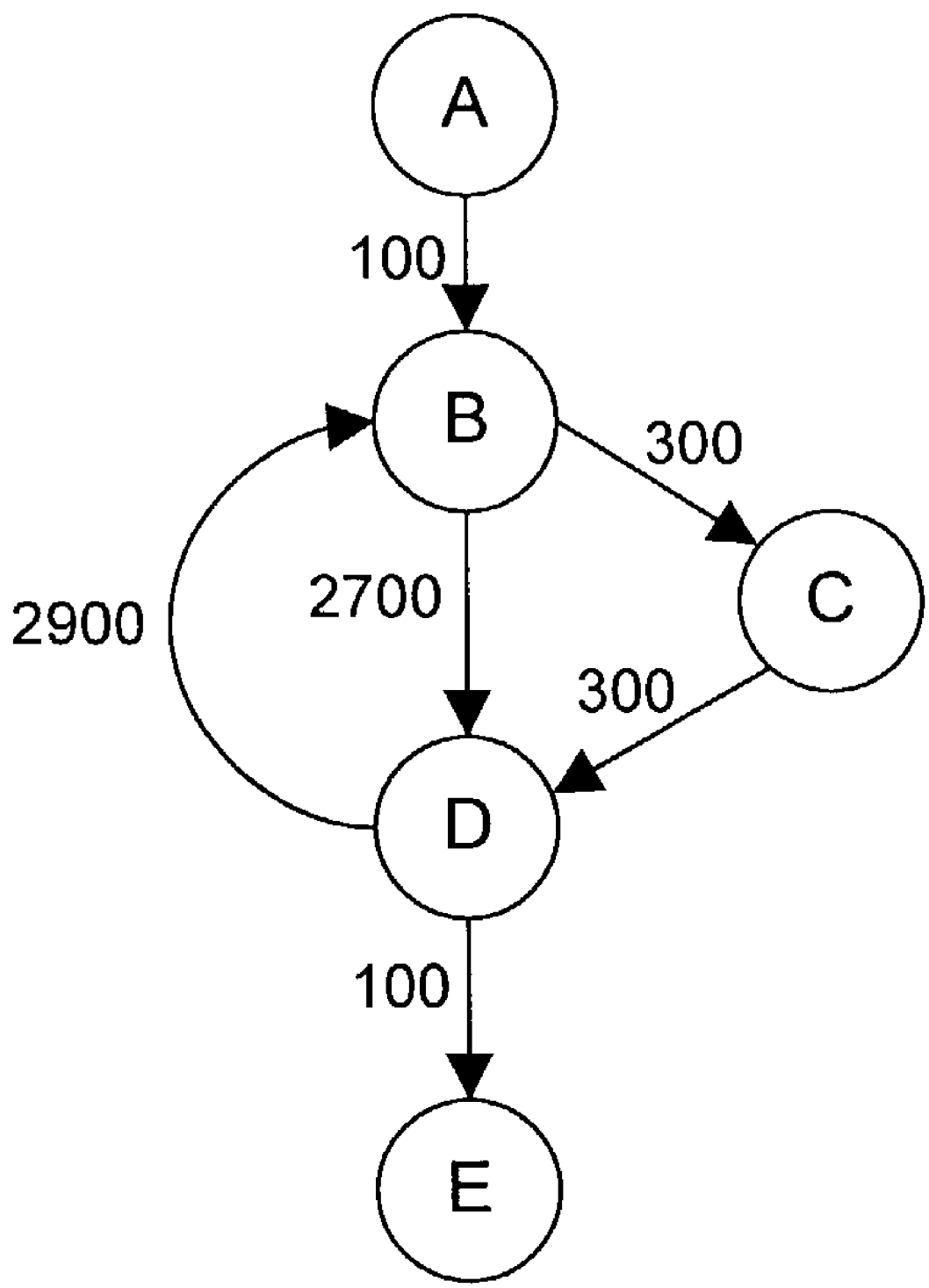
FIG. 28 is a sample control flow graph.

FIG. 28 shows a sample control flow graph for a simple static unrolling example. The execution frequencies have changed to show the loop being executed 30 times per entry. Again, we assume this is a branch-on-count loop, with 30 loaded into CTR in block A, and a bcf statement in block D. Referring now to FIG. 8, the formation of the superblock using tail formation (step 410) results in the control flow diagram shown in FIG. 25. We assume the superblock is eligible for unrolling (step 420=YES), and that complete unrolling is unacceptable (step 830=NO) because duplicating the hot trace thirty times would lead to excessive code bloat. We further assume that static unrolling is acceptable (step 850=YES), so we perform static unrolling in step 860, shown in detail in FIG. 10.

Figure 29:
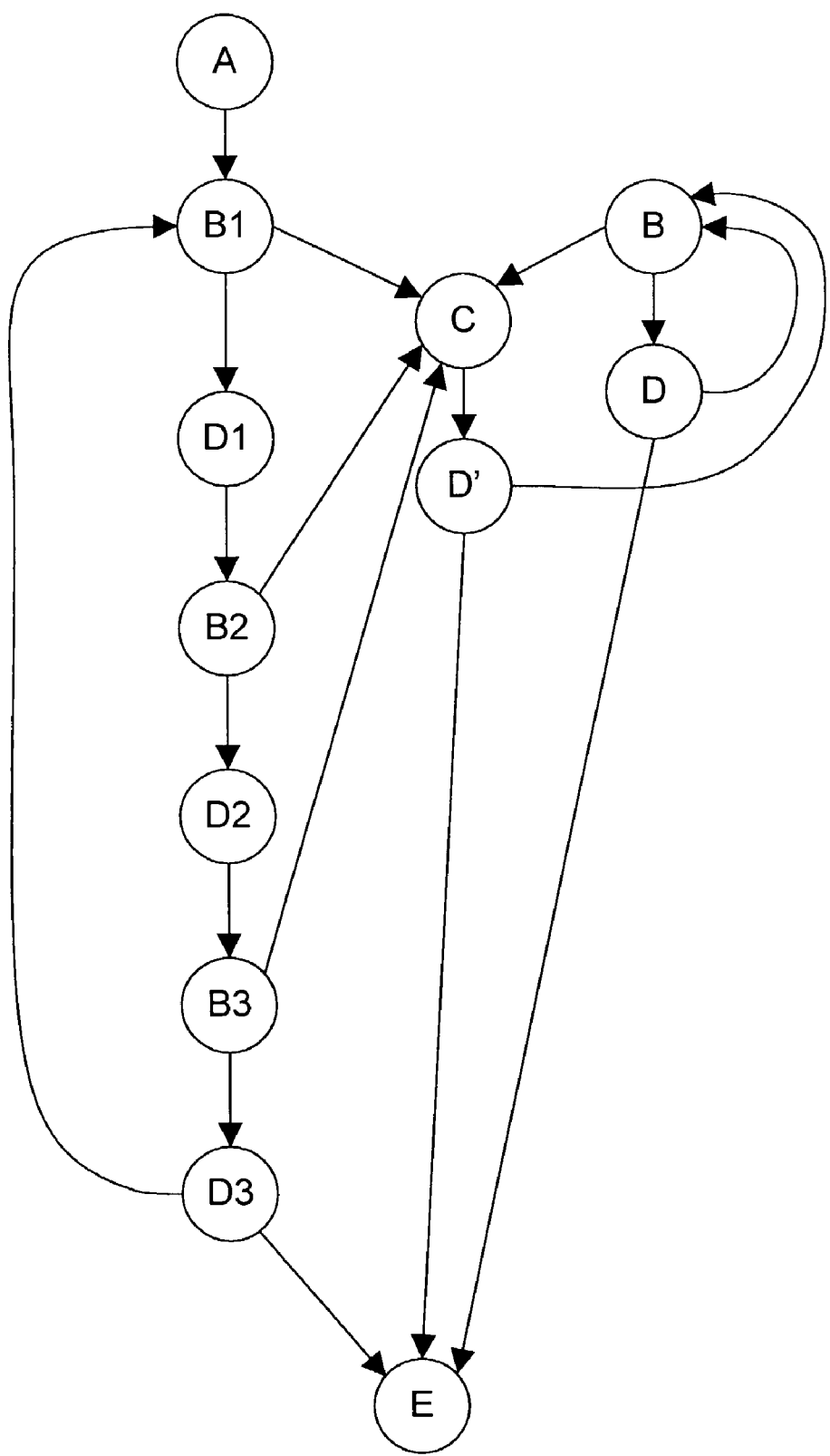
FIG. 29 is the control flow graph of FIG. 28 after superblock formation and after unrolling the superblock three times.

We select a static unroll factor UF of three (step 1010). Note that the determination of an unroll factor UF may be done using any suitable heuristic. We duplicate the superblock three times (step 1020), and remove the internal loop termination branches (step 1030). The result is shown in FIG. 29. Note that FIG. 29 is identical to the control flow graph of FIG. 26, with the exception of an additional arc from D3 back to B1, since the loop is not completely unrolled. There are no leftover iterations, because 30 divides evenly by the unroll factor 3, so step 1040 does nothing. We then rectify the count for incomplete unrolling (step 1050), which is shown in more detail in FIG. 13.

In our initial assumptions, we assumed this is a branch-on-count loop, so step 1310=YES. As a result, we need to add scaling rectification blocks (step 1320), shown in detail in FIG. 21. I is set to a value of one (step 2110). One is less than the unroll factor of three, so step 2120=YES. B is set to the first block in the first iteration, namely B1. Step 2140 adds a block R1 between B1 and C, where B1 contains the code CTR=CTR*3. There are still unprocessed blocks in the first iteration (step 2150=YES), so B is set to the next block in the first iteration, namely D1. There is no arc out of D1 that exits the unrolled trace, so step 2140 does nothing. There are no more unprocessed blocks in the first iteration (step 2150=NO), so I is incremented by one to a value of two (step 2160). Step 2120 is still YES, so B is set to the first block in the second iteration, namely B2. Step 2140 adds a block R2 between B2 and C, where R2 contains the code CTR=(CTR*3)−1. There is still an unprocessed block in the second iteration (step 2150=YES), so B is assigned to the next block, namely D2. There are no qualifying arcs, so step 2140 does nothing. There are no more unprocessed blocks in the second iteration (step 2150=NO), so I is incremented by one to a value of three (step 2160). Step 2120 is still YES, so B is set to the first block in the third iteration, namely B3. Step 2140 adds a block R3 between B3 and C, where R3 contains the code CTR=(CTR*3)−2. There is still an unprocessed block in the third iteration (step 2150=YES), so B is set to the next block in the third iteration, namely D3. D3 has no qualifying arcs, so step 2140 takes no action. There are no unprocessed blocks in the third iteration (step 2150=NO), so I is incremented to a value of four (step 2160). Step 2120 is now NO, which concludes step 1320. Thus, we return to FIG. 13, and we next add leftover iteration rectification blocks (step 1330), shown in detail in FIG. 23.

Step 2310 sets I to one and sets L to zero, because there are no leftover iterations. In step 2320, the value of I (one) is greater than the value of L (zero), so step 2320=NO, and step 1330 is done. Returning now to FIG. 13, there are escape arcs found (step 1340=YES). Examples of escape arcs in FIG. 29 are the arcs between B1 and C, between B2 and C, and between B3 and C. Each of these arcs escapes the hot trace. For this reason, inverse rectification logic is added (step 1360), as shown in detail in FIG. 22.

Figure 30:
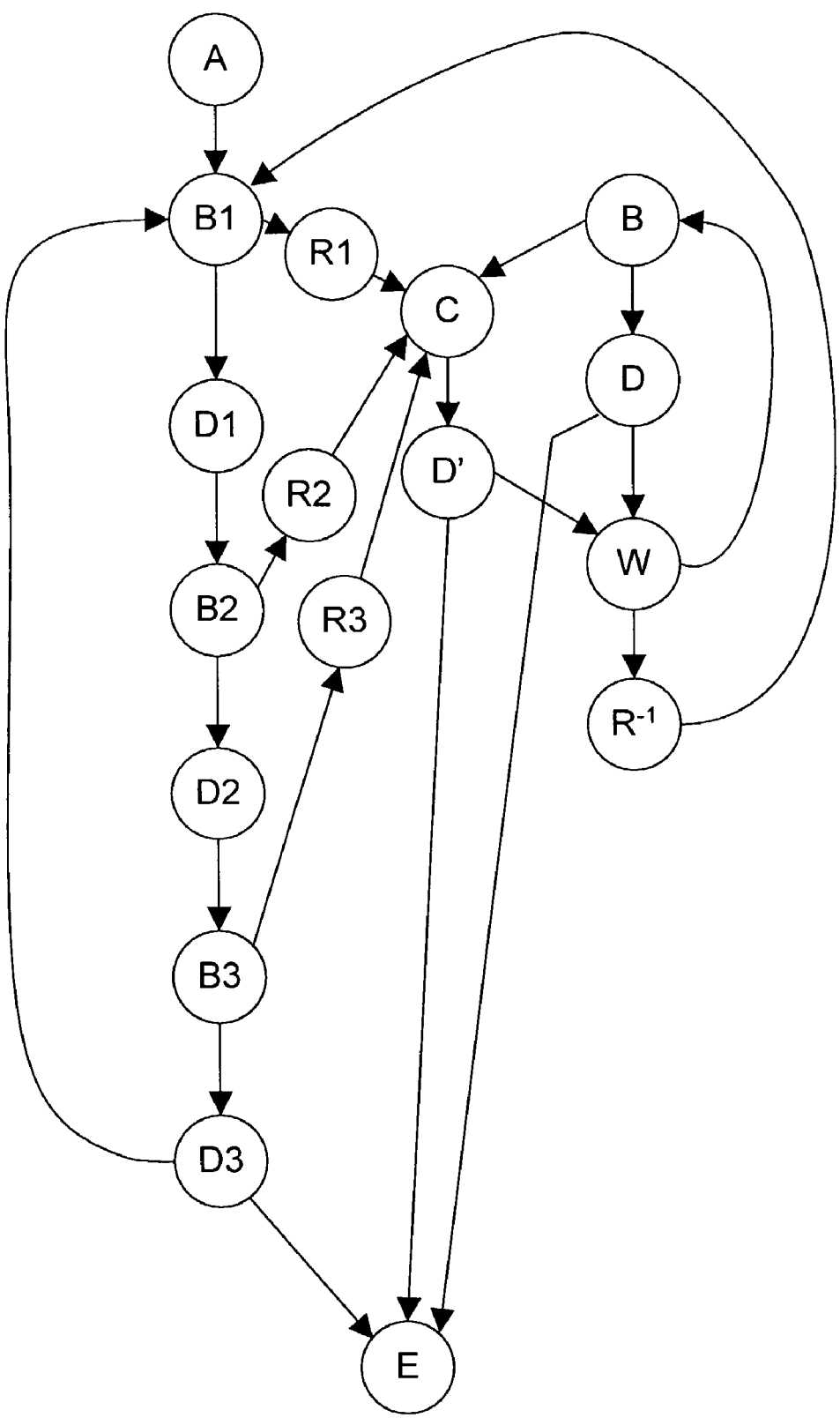
FIG. 30 is the control flow graph of FIG. 29 with the addition of count rectification code in accordance with the preferred embodiments.

Step 2210 adds a block W between D and B. The original latch block D was tail-duplicated (step 2220=YES), as shown by block D' in FIG. 29. The arc from D' to B is then redirected to target W instead (step 2230). Code is then generated in block W that compares CTR mod 3 to zero, and branches to the unrolled trace if true, otherwise branches to the original loop header block B (step 2240). An arc is then added from W to the header block B1 of the unrolled trace (step 2250). A new block $R^{-1}$ is then added along the new arc from W to B1 (step 2260). Code is then generated in $R^{-1}$ to calculate CTR=CTR/3. At this point, step 1360 is done, so control returns to step 1350 in FIG. 13. The count register initialization in block A is then modified from CTR=30 to CTR=10 (step 1350). Step 1050 is now done, step 860 is done, which completes method 800 in FIG. 8. The results are shown in the control flow graph of FIG. 30.

Figure 31:
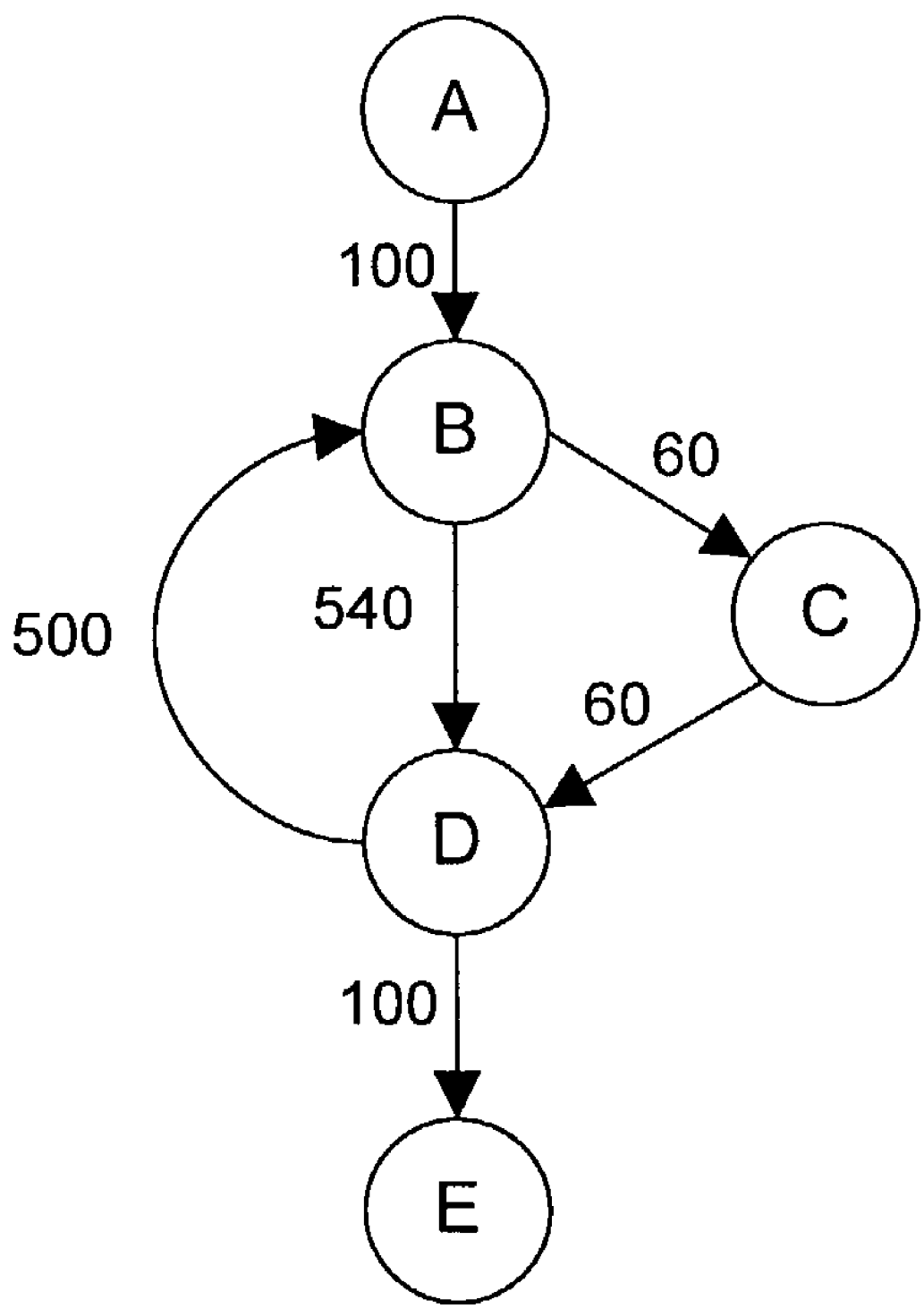
FIG. 31 is a sample control flow graph.

The control flow graph of FIG. 31 is an example where dynamic unrolling may be used. With the execution frequencies as shown in FIG. 31, the average number of loop executions per entry is six. We assume for this example that block A contains code to load the CTR from an input parameter P, so that we can't determine the exact number of iterations at compile time. Assume also that D contains the bcf instruction. We now turn to method 800 in FIG. 8 to see how the control flow diagram of FIG. 31 is processed.

Step 410 of FIG. 8 produces a superblock using tail duplication, again producing the result in FIG. 25. We assume that the superblock is eligible for unrolling (step 420=YES). Complete unrolling is unacceptable (step 830=NO) because the exact iteration count cannot be determined. For this same reason, static unrolling is also unacceptable (step 850=NO). We assume that dynamic unrolling is acceptable (step 870=YES), so dynamic unrolling is performed in step 880, which is shown in more detail in FIG. 11.

Figure 32:
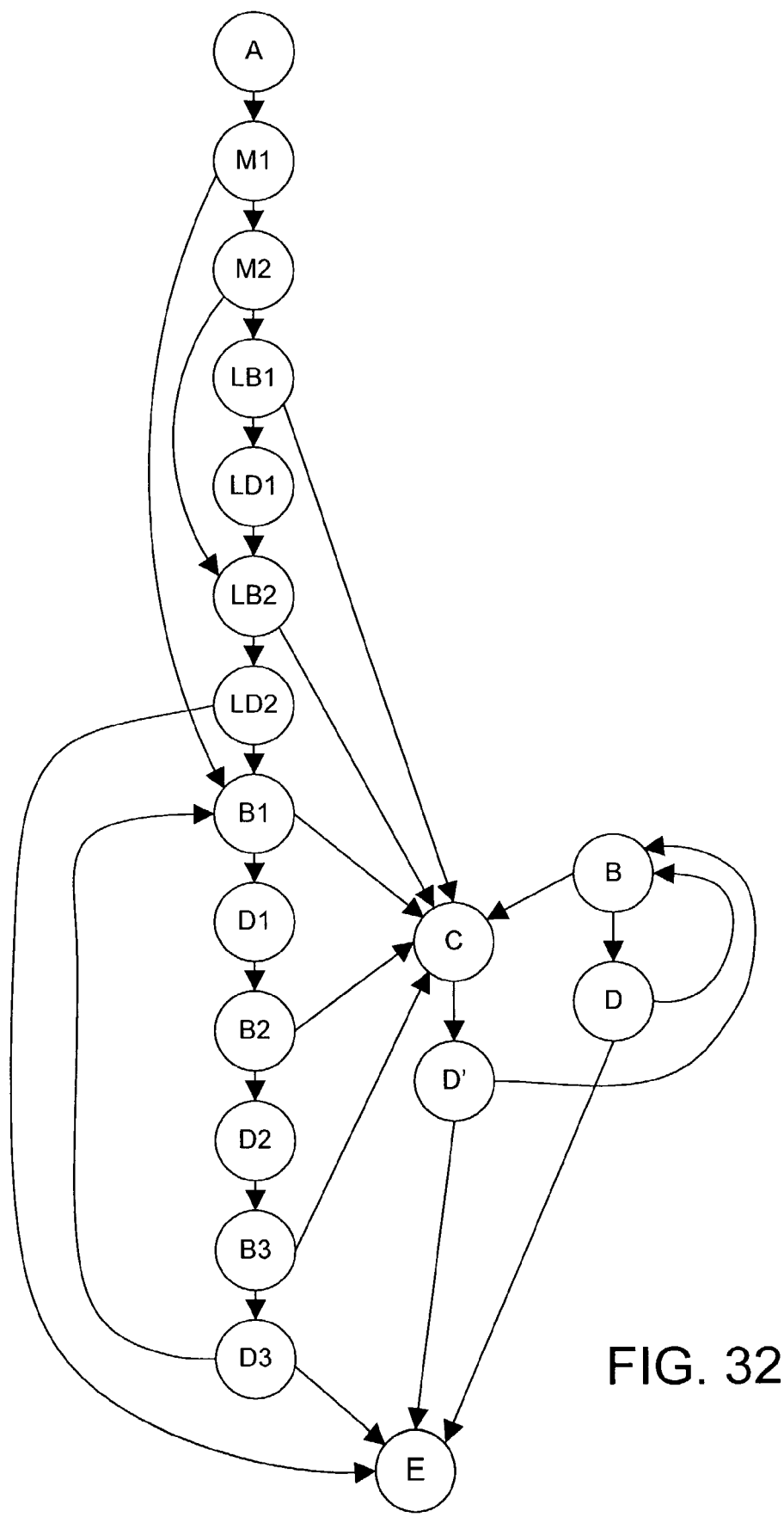
FIG. 32 is the control flow graph of FIG. 31 after superblock formation and after unrolling the superblock three times.

We select a dynamic unroll factor UF of three (step 1110). Here also, the dynamic unroll factor UF can be determined using any suitable heuristic. We then duplicate the superblock three times (step 1120), remove internal loop termination branches (step 1130), and create leftover iterations and modulus test (step 1140). The result is the control flow graph of FIG. 32. There are two leftover iterations LB1 through LD2 preceding the unrolled loop B1 through D3. Two modulus test blocks M1 and M2 are required to determine where to start. Block M1 takes the parameter value modulo 3, and if the result is zero, branches to B1, which is the beginning of the unrolled loop. If the modulus test in M1 is non-zero, the modulus test in M2 determines how many leftover iterations are needed. If the result from the modulus test in M1 is 1, it branches to LB2, otherwise it falls through to LB1. Because dynamic unrolling is incomplete unrolling, the counts must be rectified (step 1050), as shown in more detail in FIG. 13.

This is a branch-on-count loop (step 1310=YES), so scaling rectification blocks need to be added (step 1320), as shown in more detail in FIG. 21. Processing the control flow graph of FIG. 32 with method 1320 of FIG. 21 results in adding blocks R1, R2 and R3, the same as was done in the static unrolling example shown in FIG. 30 and discussed above. Once step 1320 is complete, control is passed to step 1330 in FIG. 13. Leftover iteration rectification blocks are added (step 1330), which is shown in detail in FIG. 23. I is set to one, and L is set to 2, the number of leftover iterations (step 2310). I is less than L, so step 2320 is YES. B is set to LB1, the first block in the first leftover iteration (step 2330). This is a case of dynamic unrolling, not static unrolling, so step 2340=NO. Step 2360 adds block LR1 between LB1 and C, where LR1 contains the code CTR=(CTR*3)−1. There are still unprocessed blocks in the first iteration (step 2370=YES), so B is set to the next block LD1 in the first iteration (step 2390). Step 2340=NO, but there are no qualifying arcs for LD1 (only arcs that target the backup loop are of interest), so step 2360 does nothing. There are no more unprocessed blocks in the first iteration (step 2370=NO), so I is incremented by one to a value of two (step 2380), and control passes to step 2320.

Figure 33:
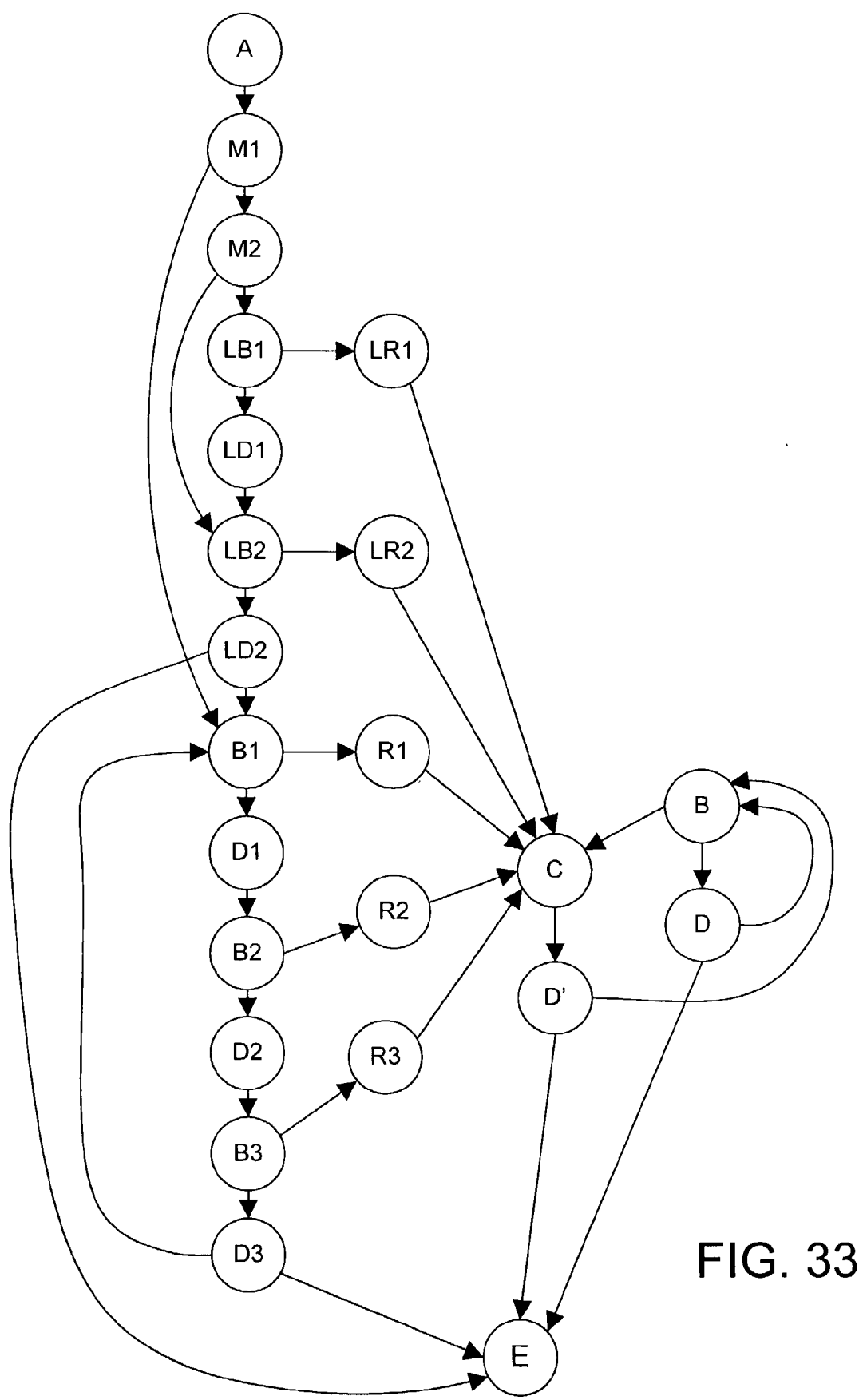
FIG. 33 is the control flow graph of FIG. 32 with the addition of some count rectification code in accordance with the preferred embodiments.

Step 2320 is still true, so B is set to the first block LB2 in the second leftover iteration (step 2330). Step 2340 is NO. Step 2360 then adds block LR2 between LB2 and C, where LR2 contains the code CTR=(CTR*3)−2. There is still an unprocessed block in the second leftover iteration (step 2370=YES), so B is set to the next block LD2 in the second leftover iteration (step 2390). Step 2340 is NO. There are no qualifying arcs out of LD2, so step 2360 does nothing. All blocks in the second leftover iteration have been processed (step 2370=NO), so I is incremented by one to a value of three (step 2380). At this point, I is not less than or equal to L, so step 2320=NO, and step 1330 is done. The results to this point are shown by the control flow graph of FIG. 33.

Figure 34:
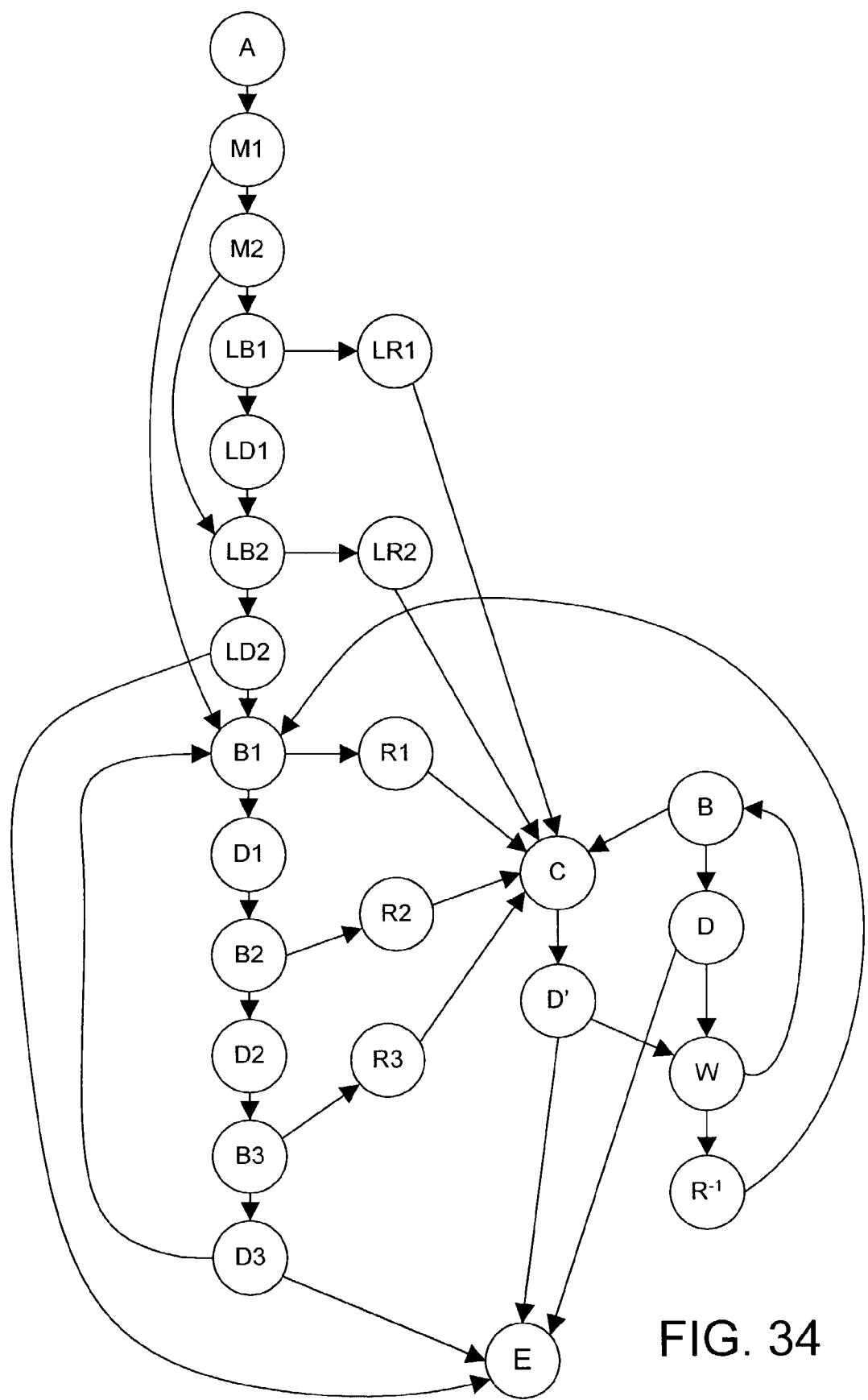
FIG. 34 is the control flow graph of FIG. 33 with additional count rectification code in accordance with the preferred embodiments.

Returning now to FIG. 13, escape arcs are found (step 1340=YES), so inverse rectification logic is added (step 1360), which is shown in detail in FIG. 22. In this case, step 1360 of FIG. 22 performs the same steps as performed in the static unrolling example shown in FIG. 30, namely to add the blocks W and $R^{-1}$, and to redirect arcs. Once the inverse rectification logic is added in step 1360 of FIG. 13, the count register initialization is modified (step 1350) to account for the unrolling. The count register initialization in block A is changed to CTR=(P/3)+1. At this point, method 1050 of FIG. 13 is done, step 1050 of FIG. 10 is done, and step 860 of FIG. 8 is done. As a result, method 800 is done. The results are shown in the control flow graph in FIG. 34.

Figure 35:
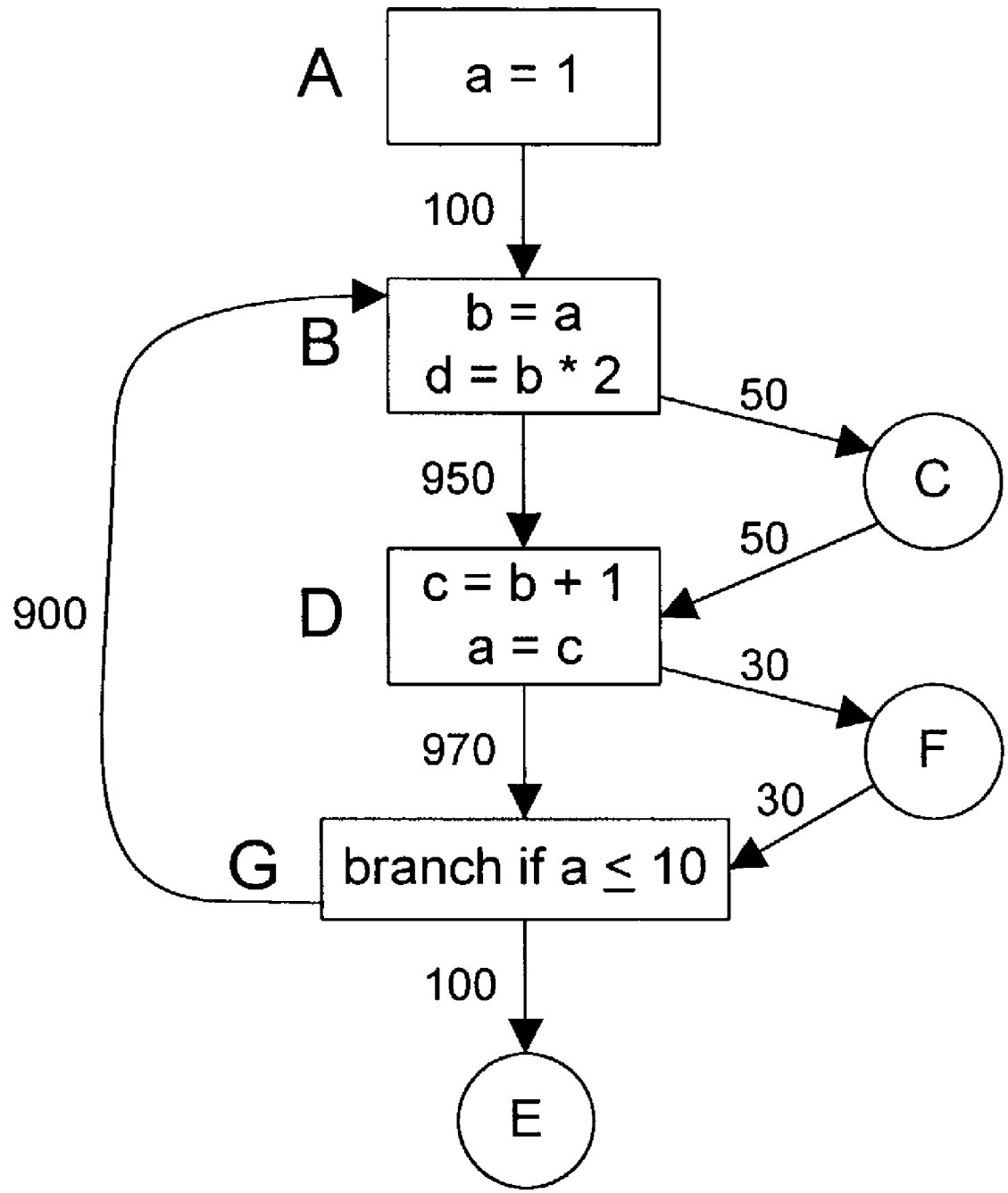
FIG. 35 is a sample control flow graph.

The final example uses static unrolling on a loop that doesn't use the count register. FIG. 35 shows a control flow graph, where some of the statements inside of some of the blocks are visible. We assume there are more statements present, but the ones shown in FIG. 35 are used in this example. We can determine at compile time that the loop will be executed exactly ten times per entry. We assume that variable "d" has uses outside the loop but not inside. We also assume for the sake of subsequent optimizations that all mentions of variables "b" and "c" are shown in FIG. 35. We now turn to method 800 in FIG. 8 to see how static unrolling may be used to unroll the program portion shown in FIG. 35.

Figure 36:
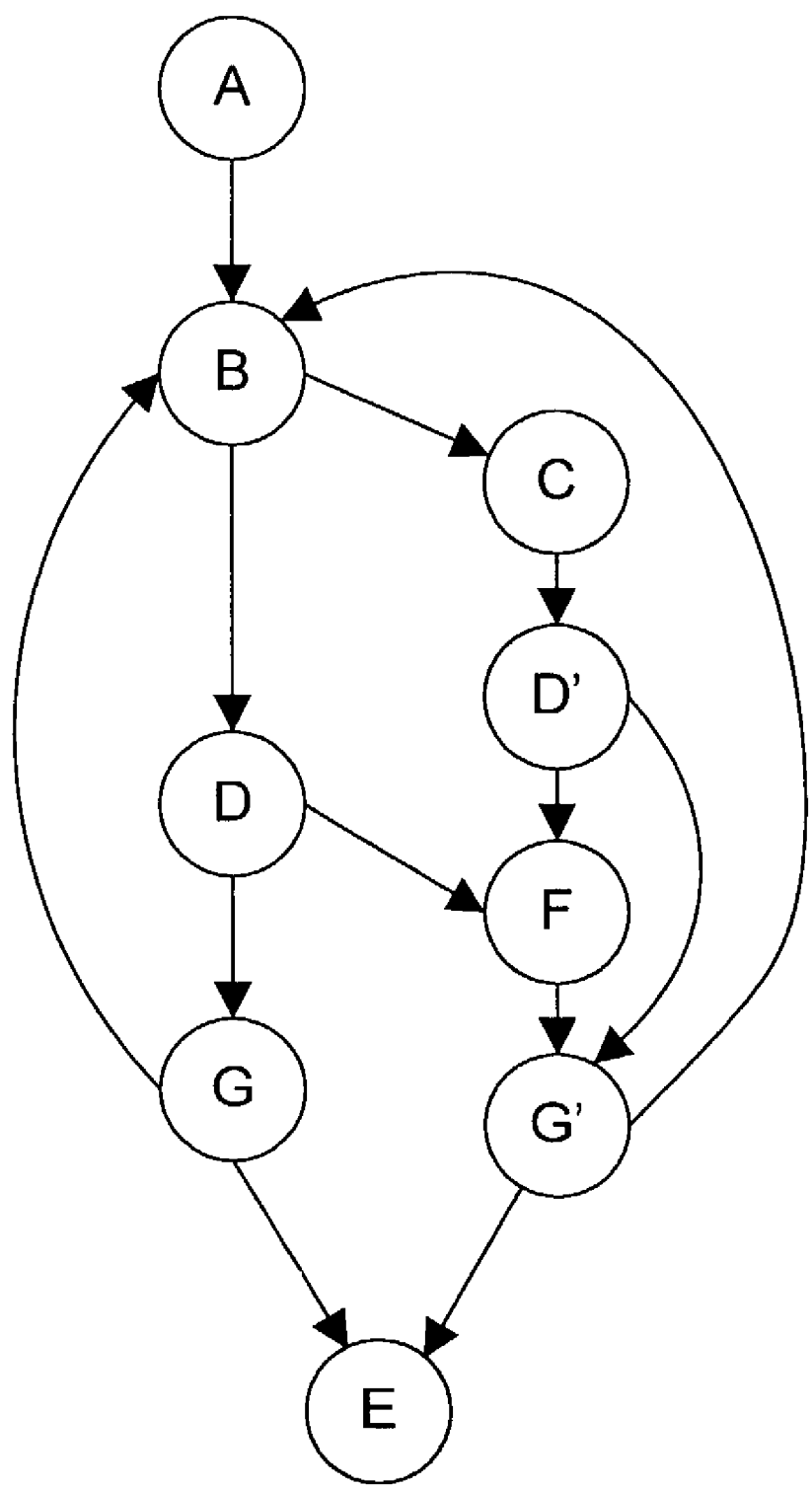
FIG. 36 is the control flow graph of FIG. 35 after superblock formation.

Tail duplication in step 410 of FIG. 8 results in the control flow graph of FIG. 36, where both D and G had to be duplicated. We assume the superblock is eligible for unrolling (step 420=YES). Complete unrolling is unacceptable (step 830=NO), because unrolling the loop ten times would result in an excessive amount of code. We assume that static unrolling is acceptable (step 850=YES). As a result, static unrolling is performed (step 860), which is shown in detail in FIG. 10.

Figure 37:
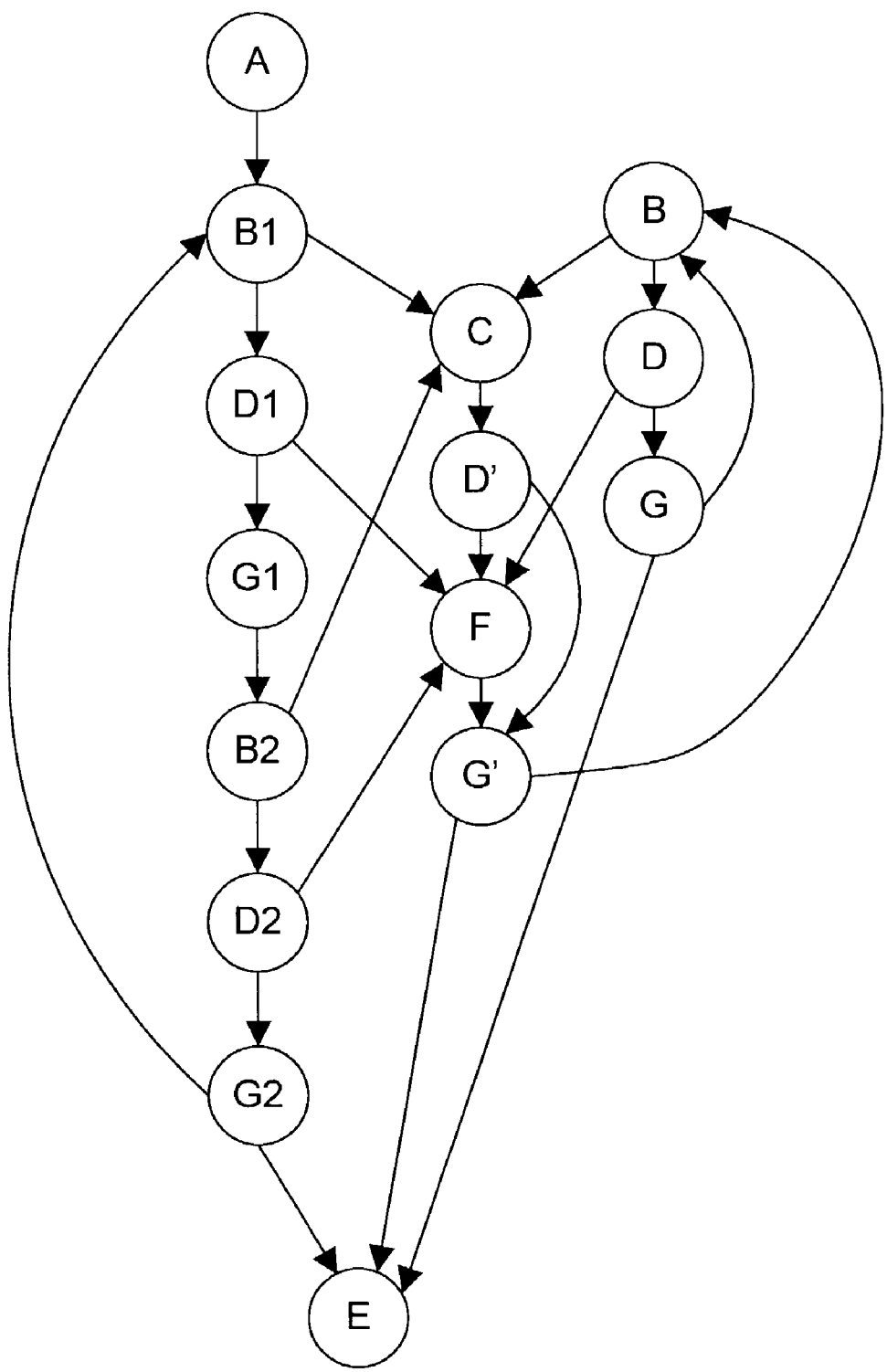
FIG. 37 is the control flow graph of FIG. 36 after unrolling the superblock twice in accordance with the preferred embodiments.

We select a static unroll factor UF of 2. The superblock is duplicated twice (step 1020), and the internal loop termination branches are removed (step 1030). There are no leftover iterations (step 1040), because 10 divides by 2 evenly. The result is the control flow graph of FIG. 37. Because the unrolling was incomplete count rectification is needed (step 1050), as shown in more detail in FIG. 13.

This is not a branch-on-count loop (step 1310=NO), so bump optimization and rectification is performed (step 1230), as shown in more detail in FIG. 15. Step 1510 determines that register a is the loop termination register, because it is used in the comparison at the end of the loop in block D of FIG. 35, and that the original bump amount N is one. A new register X' is allocated, and a copy statement X'=X is inserted at the beginning of the first unrolled iteration (step 1520). For the specific example in FIG. 35, a new register r is allocated, and a copy instruction r=a is inserted at the top of B1. Set $S_0$ is initialized with members X'=r and X=a; set $S_1$ is initialized to null; and $Y_0$ is initialized to X'=r (step 1530). I is then set to a value of one (step 1540). I is less than UF (step 1550=YES), so $Y_1$ is set to a new symbolic register (step 1560) that we call t. B is set to the first block B1 in the unrolled first iteration (step 1570). B1 is then processed for bump optimization and rectification (step 1580), as shown in more detail in FIG. 16.

We now examine the first statement S in B1, which is b=a (from FIG. 35). Note that we do not consider the statement we added to B1 in step 1520 of FIG. 15. S is a copy statement, with R'=b and R=a (step 1640=YES). The copy statement S is then processed (step 1650), as shown in more detail in FIG. 17. R corresponds to a, which is an element of $S_0$ (step 1710=YES). R', which is b, is then added to set $S_0$; b is removed from set $S_1$ (which has no effect), and a in S is replaced by the canonical representative r, resulting in the statement S being b=r (step 1720). At this point, step 1650 in FIG. 16 is done. There are more statements in B to process (step 1610=YES), so S is set to the next statement in B, which is "d=b*2". This statement is not a copy statement (step 1640=NO), and is not a possible bump statement (step 1660=NO), so the general statement S is processed (step 1680), as shown in more detail in FIG. 19.

Register b is a used register in S that is an element of set $S_0$, so b is replaced by r in statement S (step 1910), with the result d=r*2. There are no used registers in S that are elements of set $S_1$, so step 1920 does nothing. The defined register d in S is in neither $S_0$ nor $S_1$, so step 1930 does nothing. At this point, step 1680 is done, which passes control to step 1610 in FIG. 16. There are no more statements in B1 to process (step 1610=NO), so copy rectification blocks are added for B1 (step 1620), as shown in detail in FIG. 20.

Register a corresponds to X in FIG. 20, and is not an element of set $S_1$ (step 2010=NO). As a result, Z is set equal to r (step 2030). There are unprocessed exit arcs out of B (step 2040=YES), so A is set to the next unprocessed exit arc out of B, namely the arc from B1 to C (step 2050). A new block RB1 is inserted along the arc, containing the code "a=r" (step 2060). All exit arcs out of B have been processed (step 2040=NO), so step 1620 is done, which means that step 1580 is also done. Referring to FIG. 15, there are more blocks in the first unrolled iteration to process (step 1590=YES), so B is set to the next block D1 in the first unrolled iteration (step 1592). D1 is then processed for bump optimization and rectification (step 1580), shown in detail in FIG. 16.

S is set to the first statement in D1, which is c=b+1. This statement is not a copy statement (step 1640=NO), but is a possible bump statement (step 1660), with R'=c and R=b. As a result, the bump statement is processed (step 1670), shown in detail in FIG. 18.

Register b is an element in set $S_0$ (step 1810=YES), so an instruction t=r+1 is inserted prior to S in D1 (step 1820). Register b is then replaced with the canonical representative of set $S_0$, which is r (step 1830). The result is statement S that reads c=r+1. Registers t and c are added to set $S_1$, with representative t, while set $S_0$ remains {r, a, b}. At this point, step 1670 is done, which passes control to step 1610 in FIG. 16. There are more statements in D1 to process (step 1610=YES), so S is set to the next statement in D1, namely a=c (step 1630). This statement is a copy statement (step 1640=YES), with R'=a and R=c. The copy statement a=c is then processed (step 1650), shown in detail in FIG. 17. Register c is not an element of set $S_0$ (step 1710=NO), but is an element of set $S_1$ (step 1730=YES). Register a is added to set $S_1$, resulting in $S_1$={t, c, a}; a is removed from set $S_0$, resulting in $S_0$={r, b}; and c is replaced in statement S with the canonical representative t, resulting in the statement a=t (step 1740). Step 1650 is now done, which transfers control to step 1610 of FIG. 16. There are no more statements in B to process (step 1610=NO), so copy rectification blocks for B are added (step 1620), shown in detail in FIG. 20.

Register a corresponds to X in step 2010, and is an element of $S_1$, which currently contains {t, c, a}. Z is set to t in step 2020. There are unprocessed exit arcs out of block D1 (step 2040=YES), so A is set to the next unprocessed exit arc out of B, namely the arc from D1 to F (step 2050). A new block RD1 is inserted that contains the code a=t (step 2060). At this point, step 1620 is done and step 1580 is done, which passes control to step 1590 in FIG. 15. There are still more blocks in the unrolled first iteration (step 1590=YES), so B is set to the next block G1 in the unrolled first iteration (step 1592). There are no statements in G1 since the branch was removed (step 1610=NO). Copy rectification blocks for G1 are added (step 1620), shown in detail in FIG. 20.

Register a still corresponds to X in step 2010, and is an element of $S_1$, which currently contains t, c and a. Z is set to t in step 2020. There are no unprocessed exit arcs out of G1 (step 2040=NO), so step 1620 is done, step 1580 is done, which passes control to step 1590 in FIG. 15. There are no more blocks in the first unrolled iteration (step 1590=NO), so $S_1$ is copied to $S_0$, $S_1$ is set to null; and I is incremented by one to a value of two (step 1594). $S_0$ thus contains {t, c, a} while $S_1$ is null. I is still less than or equal to the unroll factor UF (step 1550=YES), so a new symbolic register u is allocated for $Y_2$ (step 1560). B is then set to the first block B2 in the unrolled second iteration (step 1570). B2 is then processed for bump optimization and rectification (step 1580), shown in detail in FIG. 16.

There are more statements in B to process (step 1610=YES), so S is assigned the next statement in B, which is b=a. S is a copy statement (step 1640=YES), with R'=b and R=a. We then process the copy statement S (step 1650), shown in detail in FIG. 17. Register a is an element of $S_0$, which currently contains {t, c, a} (step 1710=YES). As a result, b is added to $S_0$, resulting in $S_0$ containing {t, c, a, b}; b is removed from $S_1$, but because it was not in $S_1$, this does nothing; and a in S is replaced by t, resulting in statement S reading b=t. At this point, step 1650 is done, which transfers control to step 1610 in FIG. 16. There are still more statements in B2 to process (step 1610=YES), so S is set to the next statement in B2, namely d=b*2. This statement is not a copy statement (step 1640=NO) and is not a possible bump statement (step 1660=NO), so the general statement S is processed (step 1680), shown in detail in FIG. 19.

Register b is a used register in statement S that is also an element of set $S_0$, so b is replaced by t in statement S, resulting in the statement d=t*2. Steps 1920 and 1930 do nothing, so step 1680 is done, which passes control to step 1610 in FIG. 16. There are no more statements in B2 to process (step 1610=NO), so copy rectification blocks for B are added (step 1620), shown in detail in FIG. 20. Register a corresponds to X in step 2010, and a is not in set $S_1$ (step 2010=NO). Z is set to t in step 2030. There are unprocessed exit arcs out of B2 (step 2040=YES), namely the arc from B2 to C. A is assigned to this arc (step 2050). A new block RB2 is then inserted along arc A, where RB2 includes the code a=t (step 2060). There are no more unprocessed exit arcs out of B2 (step 2040=NO), so step 1620 is done, step 1580 is done, which passes control to step 1590 in FIG. 15. There are more blocks in the second unrolled iteration (step 1590=YES), so B is set to the next block D2 in the second unrolled iteration (step 1592). D2 is then processed for bump optimization and rectification (step 1580), shown in detail in FIG. 16.

There are more statements in D2 (step 1610=YES), so S is set to the next statement in D2, namely c=b+1. This statement is not a copy statement (step 1640=NO), but is a possible bump statement (step 1660=YES), with R'=c and R=b. The bump statement is then processed (step 1670), shown in detail in FIG. 18. Register b is an element of $S_0$, which currently contains {t, c, a, b} (step 1810=YES), so a new bump instruction u=r+2 is inserted prior to S (step 1820). The b in statement S is replaced with t, resulting in c=t+1 (step 1830). Registers c and u are then added to $S_1$ (which was null), resulting in $S_1$ containing {c, u}, with representative u; and c and u are removed from $S_0$, resulting in $S_0$ containing {t, a, b} (step 1840). At this point, step 1670 is done, which passes control to step 1610 of FIG. 16. There are more statements in D2 (step 1610=YES), so S is set to the next statement in D2, namely a=c. This is a copy statement (step 1640=YES), with R'=a and R=c. We thus process the copy statement a=c (step 1650), shown in detail in FIG. 17.

Register c is not an element of set $S_0$ (step 1710=NO), but is an element of $S_1$ (step 1730=YES). As a result, a is added to $S_1$, resulting in $S_1$ containing {u, c, a}; a is removed from $S_0$, resulting in $S_0$ containing {t, b}; and c in statement S is replaced with representative u, resulting in statement S of a=u (step 1740). Step 1650 is done, which transfers control to step 1610 in FIG. 16. There are no more statements in D2 to process (step 1610=NO), so copy rectification blocks for D2 are added (step 1620), shown in detail in FIG. 20.

Register a corresponds to X in step 2010, and a is an element of $S_1$ (step 2010=YES), so Z is set to u (step 2020). There are unprocessed exit arcs out of D2 (step 2040=YES), namely the arc from D2 to F. A is assigned to this arc (step 2050). A new block RD2 is then inserted along arc A, where RD2 includes the code a=u (step 2060). There are no more unprocessed exit arcs out of D2 (step 2040=NO), so step 1620 is done, step 1580 is done, which passes control to step 1590 in FIG. 15. There is another block G2 in the second unrolled iteration (step 1590=YES), so B is set to the next block G2 in the second unrolled iteration (step 1592). G2 is then processed for bump optimization and rectification (step 1580), shown in detail in FIG. 16.

There are more statements in G2 to process (step 1610=YES), so S is set to the next statement in B, namely "branch if a≦10" (step 1630). This statement is not a copy statement (step 1640=NO), and is not a possible bump statement (step 1660=NO), so this general statement is processed (step 1680), shown in detail in FIG. 19. Step 1910 has no effect. Step 1920 changes statement S to "branch if u≦10". Step 1930 has no effect. This completes step 1680, which transfers control to step 1610 in FIG. 16. There are no more statements in G2 to process (step 1610=NO), so copy rectification blocks for G2 are added (step 1620), shown in detail in FIG. 20.

Figure 38:
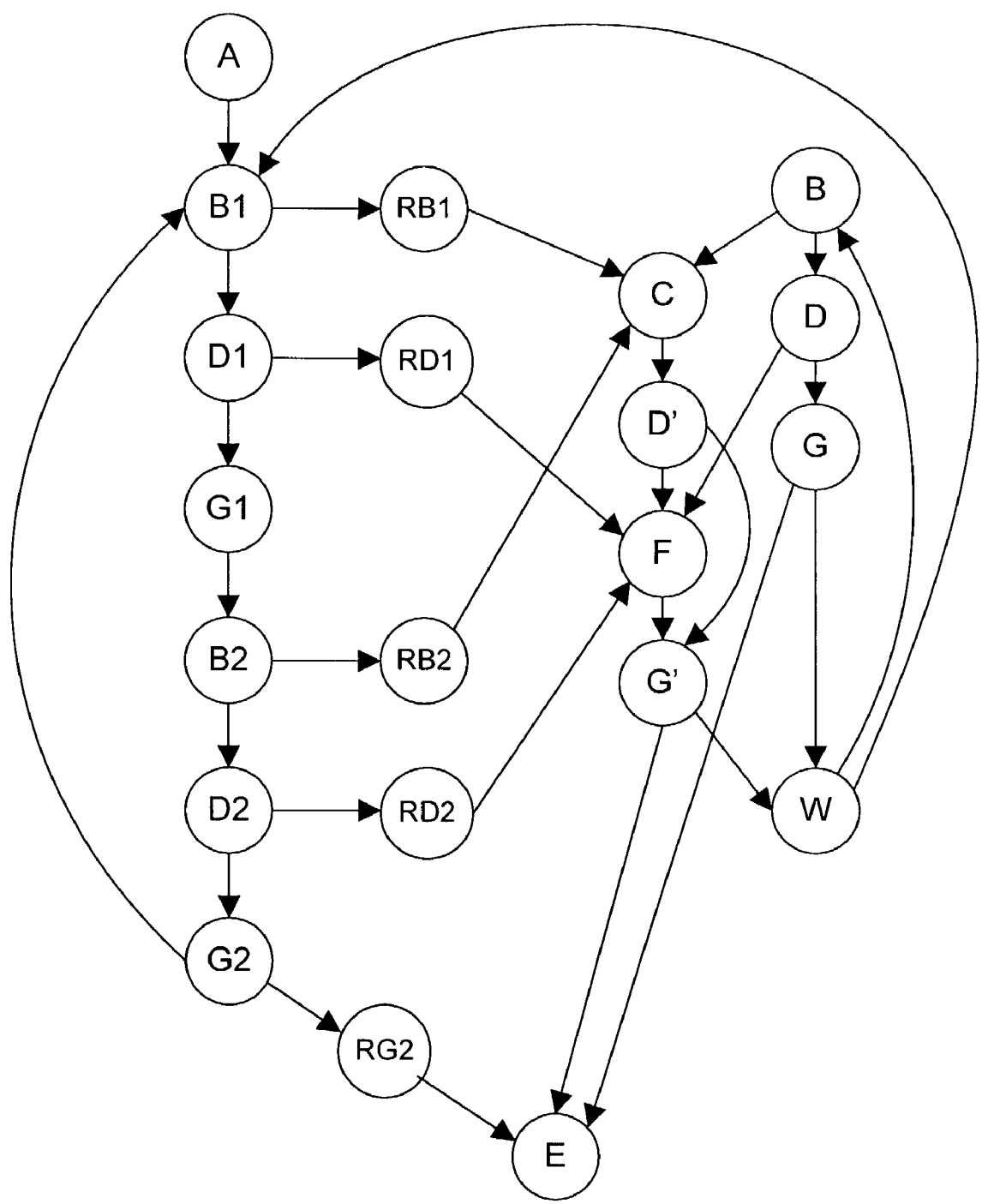
FIG. 38 is the control flow graph of FIG. 37 with the addition of some count rectification code in accordance with the preferred embodiments.
Figure 39:
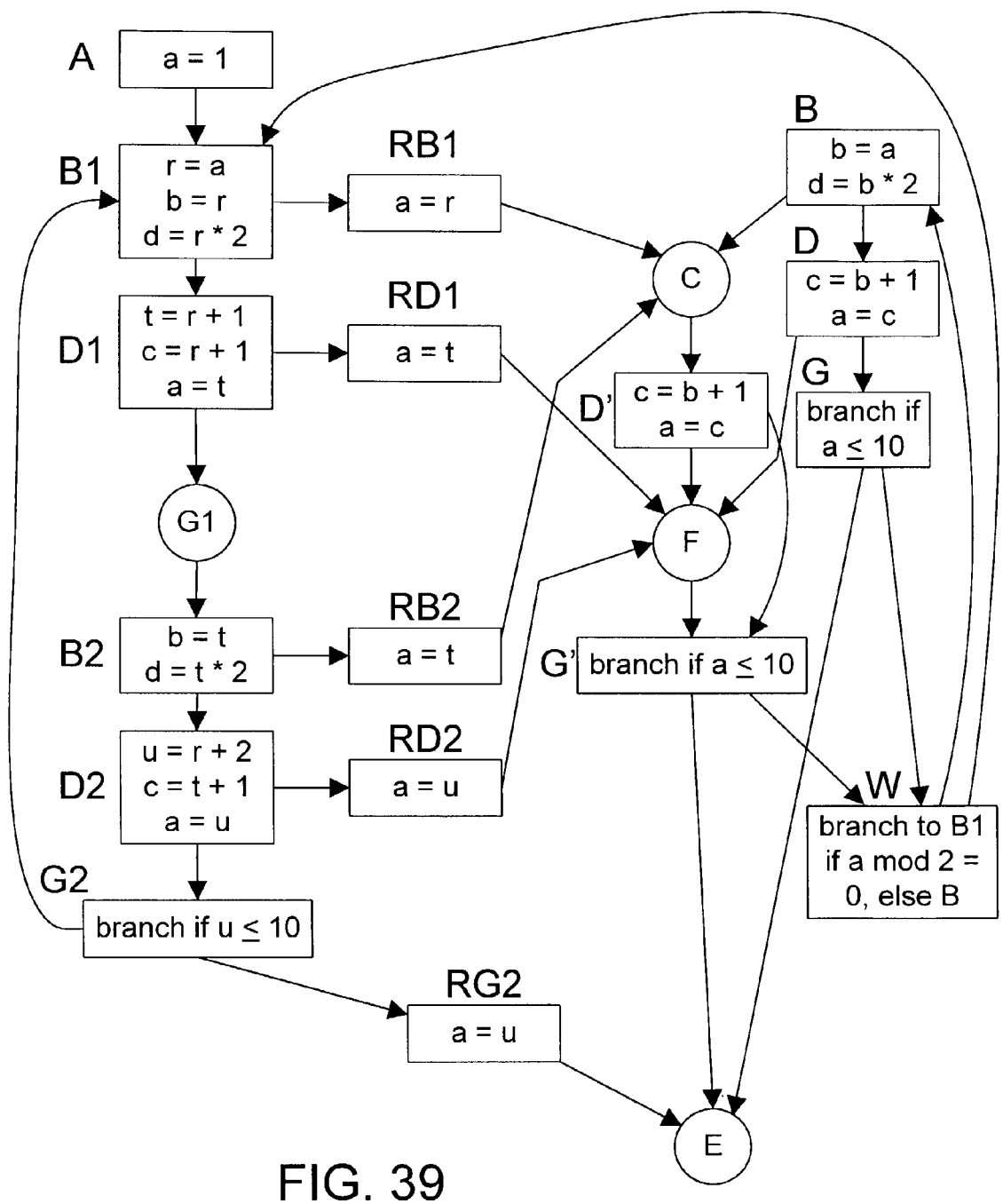
FIG. 39 is the control flow graph of FIG. 38 with expanded blocks to show changed instructions in accordance with the preferred embodiments.

Register a corresponds to X in step 2010, and is an element of set $S_1$ (step 2010=YES). Z is then set to u (step 2020). There is one unprocessed exit arc out of G2 (step 2040=YES), namely the arc from G2 to E. A is set to this arc (step 2050), and a new block RG2 is inserted along A, where RG2 includes the code a=u (step 2060). There are no more unprocessed exit arcs out of G2 (step 2040=NO), so step 1620 is done, step 1580 is done, which transfers control to step 1590 of FIG. 15. There are no more blocks in the second unrolled iteration (step 1590=NO), so $S_1$ is copied to $S_0$, $S_1$ is set to null, and I is incremented by one to a value of three (step 1594). I is now greater than the unroll factor of two, so step 1550=NO, and step 1230 is complete. Returning to FIG. 13, a new block W is added containing code to branch to block B1 if register a modulo 2 has a value of zero, and to block B otherwise (step 1370). The arcs from G and G' to B are redirected to block W instead (step 1380). Step 1050 is now complete, step 860 is complete, which completes method 800 in FIG. 8. The result is shown in the control flow graph of FIG. 38 at a high level. FIG. 39 shows the same control flow graph with the changes to the instructions introduced by performing the static unrolling in step 860 of FIG. 6, described in detail above.

Figure 40:
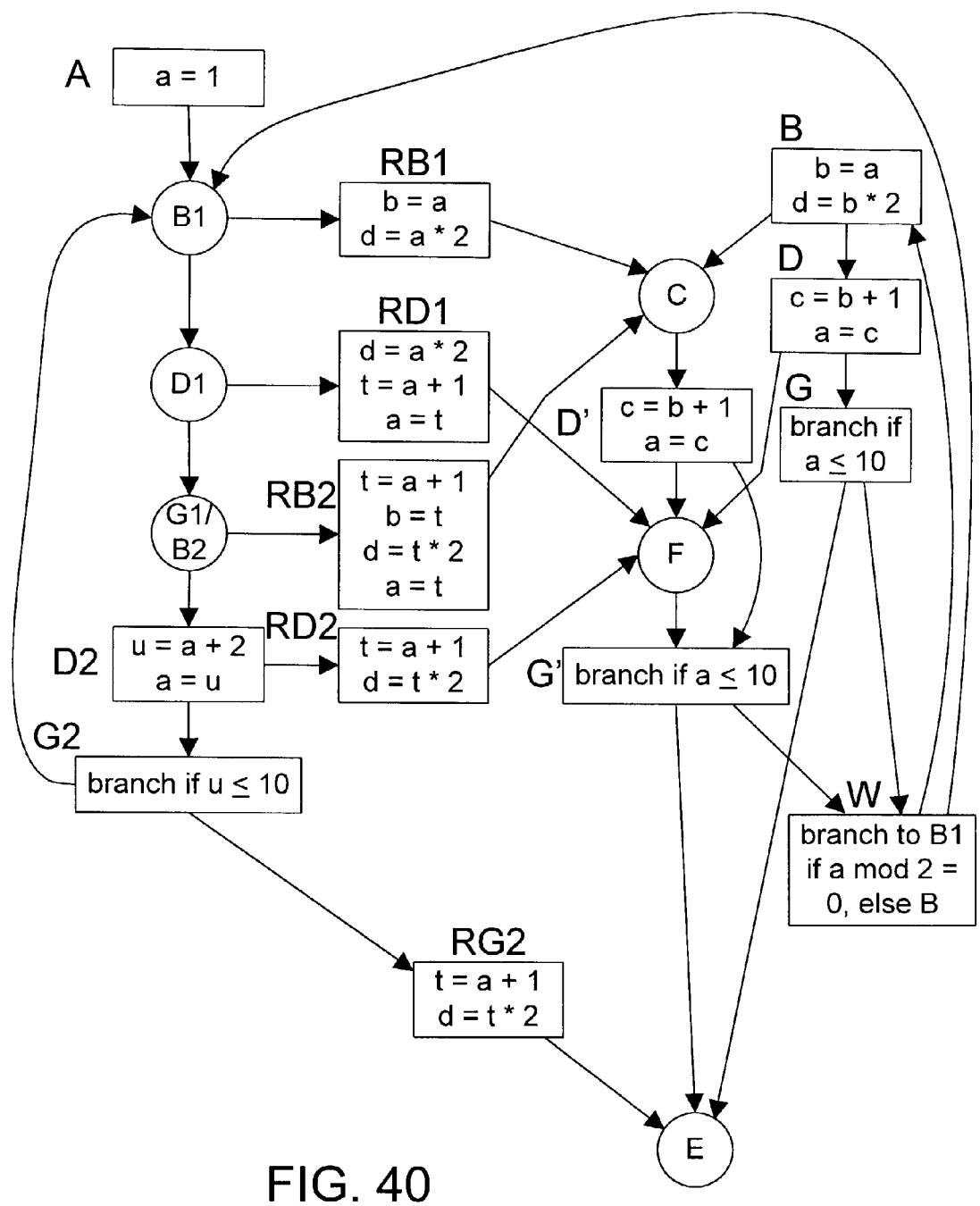
FIG. 40 is the control flow graph of FIG. 39 after applying several prior art optimizations.

At first glance at FIG. 39, it doesn't appear that we've improved the code very much. Lots of extra instructions were introduced. But the method of the preferred embodiments relies on several prior art optimization phases to be executed on the control flow graph of FIG. 39. One such optimization is operation migration, described in the Hwu et al. reference, supra. Other prior art optimizations are described in Muchnick, "Advanced Compiler Design and Implementation", Morgan Kaufman Publishers, (1997), and include: dead code elimination, copy propagation, value numbering, and branch straightening. Branch straightening combines blocks G1 and B2. The result of applying the prior art optimizations on the control flow graph of FIG. 39 is shown by the control flow graph of FIG. 40.

The bump optimization performed herein removes dependencies from the bump instructions and related instructions in each of the unrolled iterations. Thus, the only bump instruction that needs to be performed, so long as control remains in the superblock, is "u=a+2" in block D2 of FIG. 40. If control exits the superblock at any point, the proper values are restored only along those exit paths. This makes the operation of the expected path, the superblock, very efficient. We only pay the cost of other operations when leaving the superblock, taking a less heavily frequented path. This is done at some cost in terms of code bloat, since some instructions are duplicated several times, but the total number of executions of those instructions is decreased.

The preferred embodiments allow performing complete, static, or dynamic unrolling of a superblock. Count rectification is performed to adjust loop counter values if control exits the superblock. By providing more sophisticated methods for unrolling a superblock, more optimizations may be made to a computer program, thereby increasing its run-time performance.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a first instruction stream residing in the memory; and
   a profile-based superblock unroller residing in the memory and executed by the at least one processor, the superblock unroller forming and unrolling a superblock in the first instruction stream according to profile data, the superblock unroller including a count rectifier that inserts at least one block in the first instruction stream outside the superblock that adjusts at least one counter value to account for an exit from the superblock.

2. The apparatus of claim 1 wherein types of unrolling performed by the superblock unroller include complete unrolling, static unrolling, and dynamic unrolling.

3. The apparatus of claim 1 wherein the superblock unroller uses complete unrolling if a number of iterations of the superblock is sufficiently small and if the number of iterations is known at compile-time.

4. The apparatus of claim 1 wherein the superblock unroller uses static unrolling if a number of iterations of the superblock is too large for complete unrolling and if the number of iterations is known at compile-time.

5. The apparatus of claim 1 wherein the superblock unroller uses dynamic unrolling if a number of iterations of the superblock is unknown at compile-time.

6. An apparatus comprising:
at least one processor;
a memory coupled to the at least one processor;
a first instruction stream residing in the memory;
a profile-base superblock unroller residing in the memory and executed by the at least one processor, the superblock unroller forming and unrolling a superblock in the first instruction stream according to profile data, the superblock unroller including a count rectifier that inserts at least one block in the first instruction stream outside the superblock that adjust at least one counter value to account for an exit from the superblock, wherein the superblock unroller uses complete unrolling if a number of iterations of the superblock is suffciently small and if the number of iterations is known at compile-time, wherein the superblock unroller uses static unrolling if the number of iterations of the superblock is too large for complete unrolling and if the number of iterations is known at compile-time, and wherein the superblock the superblock unroller uses dynamic unrolling if the number of iterations is unknown at compile-time.

7. A method for optimizing a first instruction stream comprising the steps of:
creating a superblock in the first instruction stream according to profile data;
unrolling the superblock; and
providing count rectification code in the first instruction stream external to the superblock to adjust at least one counter value to account for an exit from the superblock.

8. The method of claim 7 wherein the step of unrolling the superblock comprises the step of performing complete unrolling of the superblock if a number of iterations of the superblock is sufficiently small and if the number of iterations is known at compile-time.

9. The method of claim 7 wherein the step of unrolling the superblock comprises the step of performing static unrolling of the superblock if a number of iterations of the superblock is too large for complete unrolling and if the number of iterations of the superblock is unknown at compile-time.

10. The method of claim 7 wherein the step of unrolling the superblock comprises the step of performing dynamic unrolling of the superblock if a number of iterations is known at compile-time.

11. A method of optimizing a first instruction stream comprising the steps of:
creating a superblock in the first instruction stream according to profile data;
if a number of iterations of the superblock is sufficiently small and if the number of iterations is known at compile-time, performing complete unrolling of the superblock;
if the number of iterations is too large for complete unrolling and if the number of iterations is known at compile-time, perfoming static unrolling of the superblock;
if the number of iterations of the superblock is unknown at compile-time, performing dynamic unrolling of the superblock; and
providing count rectification code in the first instruction stream external to the superblock to adjust at least one counter value to account for an exit from the superblock.

12. A computer-readable program product comprising;
(A) a profile-based superblock unroller that forms and unrolls a superblock in a first instruction stream according to profile data, the superblock unroller including a count rectifier that inserts at least one block in the first instruction stream outside the superblock that adjusts at least one counter value to account for an exit from the superblock; and
(B) recordable media bearing the profile-based superblock unroller.

13. The program product of claim 12, wherein types of unrolling performed by the superblock unroller include complete unrolling, static unrolling, and dynamic unrolling.

14. The program product of claim 12 wherein the superblock unroller uses complete unrolling if a number of iterations of the superblock is sufficiently small and if the number of iterations is known at compile-time.

15. The program product of claim 12 wherein the superblock unroller uses static unrolling if a number of iterations of the superblock is too large for complete unrolling and if the number of iterations is known at compile-time.

16. The program product of claim 12 wherein the superblock unroller uses dynamic unrolling if a number of iterations of the superblock is unknown at compile-time.

17. A computer-readable program product comprising:
(A) a profiled-based superblock unroller that forms and unrolls a superblock in a first instruction stream according to profile data, the superblock unroller including a count rectifier that inserts at least one block in the first instruction stream outside the superblock that adjusts at least one counter value to account for an exit from the superblock, wherein the superblock unroller uses complete unrolling if a number of iterations of the superblock is sufficiently small and if the number of iterations is known at compile-time, wherein the superblock unroller uses static unrolling if the number of iterations of the superblock is too large for complete unrolling and if the number of iterations is known at compile-time, and wherein the superblock unroller uses dynamic unrolling if the number of iterations is unknown at compile-time; and
(B) recordable media bearing the profiled-based superblock unroller.

* * * * *